US012792275B2

(12) United States Patent
Sicron

(10) Patent No.: US 12,792,275 B2
(45) Date of Patent: Nov. 10, 2026

(54) APPARATUS, SYSTEM, AND METHOD OF DATA ARRAY TRANSFORMATION

(71) Applicant: MobilEye Vision Technologies Ltd., Jerusalem (IL)

(72) Inventor: Merav Sicron, Kfar-Saba (IL)

(73) Assignee: MobilEye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 18/608,688

(22) Filed: Mar. 18, 2024

(65) Prior Publication Data

US 2024/0338150 A1 Oct. 10, 2024

Related U.S. Application Data

(60) Provisional application No. 63/556,744, filed on Feb. 22, 2024, provisional application No. 63/494,233, filed on Apr. 5, 2023.

(51) Int. Cl.
*G06F 3/06* (2006.01)
*G01S 13/931* (2020.01)

(52) U.S. Cl.
CPC .......... *G06F 3/0661* (2013.01); *G01S 13/931* (2013.01); *G06F 3/0611* (2013.01); *G06F 3/0673* (2013.01)

(58) Field of Classification Search
CPC .... G06F 3/0661; G06F 3/0611; G06F 3/0673; G06F 7/78; G01S 13/931
See application file for complete search history.

(56) References Cited

U.S. PATENT DOCUMENTS

| | | | | |
|---|---|---|---|---|
| 5,815,421 A * | 9/1998 | Dulong | G06T 3/602 708/520 |
| 2013/0003857 A1* | 1/2013 | Yu | H04N 19/176 375/240.18 |

(Continued)

FOREIGN PATENT DOCUMENTS

| | | |
|---|---|---|
| CN | 103048644 | 4/2013 |
| CN | 103048644 A * | 4/2013 |

(Continued)

OTHER PUBLICATIONS

CN103048644 translation (Year: 2014).*
(Continued)

*Primary Examiner* — Zhuo H Li
(74) *Attorney, Agent, or Firm* — Viering, Jentschura & Partner mbB

(57) ABSTRACT

For example, a Data Mover and Transformer (DMT) may be configured to transform a first data array from a first memory into a second data array to be stored in a second memory. The DMT may include a Row to Column (R2C) transformer configured to transform a data sub-array into a transformed data sub-array by transforming one or more rows of the data sub-array into one or more respective columns of the transformed data sub-array; a memory reader to populate the data sub-array with data retrieved from the first memory according to a memory read pattern, wherein the memory read pattern is based on a predefined transformation from the first data array to the second data array; and a memory writer to write data from the transformed data sub-array to the second memory according to a memory write pattern, wherein the memory write pattern is based on the predefined transformation.

25 Claims, 16 Drawing Sheets

(56) References Cited

U.S. PATENT DOCUMENTS

| | | | | |
|---|---|---|---|---|
| 2014/0003742 | A1 | 1/2014 | Nishimura et al. | |
| 2019/0346535 | A1* | 11/2019 | Thompson | G01S 13/931 |
| 2020/0125335 | A1* | 4/2020 | Neoh | G06F 7/78 |
| 2022/0020424 | A1* | 1/2022 | Yudanov | G11C 11/2273 |
| 2023/0258768 | A1* | 8/2023 | Amadjikpe | G01S 13/87<br>342/174 |

FOREIGN PATENT DOCUMENTS

| | | | |
|---|---|---|---|
| WO | 2021/229229 | 11/2021 | |
| WO | WO-2021229229 A1 * | 11/2021 | G06F 9/30038 |

OTHER PUBLICATIONS

International Search Report and the Written Opinion for International Application No. PCT/IB2024/052620, mailed on Jul. 8, 2024, 11 pages.

* cited by examiner

APPARATUS, SYSTEM, AND METHOD OF DATA ARRAY TRANSFORMATION

CROSS REFERENCE

This application claims the benefit of, and priority from, U.S. Provisional Patent Application No. 63/494,233 entitled "APPARATUS, SYSTEM, AND METHOD OF MULTI-DIMENSIONAL ARRAY TRANSPOSE", filed Apr. 5, 2023, and U.S. Provisional Patent Application No. 63/556,744 entitled "APPARATUS, SYSTEM, AND METHOD OF DATA ARRAY TRANSFORMATION", filed Feb. 22, 2024, the entire disclosures of which are incorporated herein by reference.

BACKGROUND

Computing systems may utilize a Direct Memory Access (DMA) mechanism to access a memory, for example, to transfer data between devices and/or memory locations, for example, without intervention, or with reduced intervention, of a system processor.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
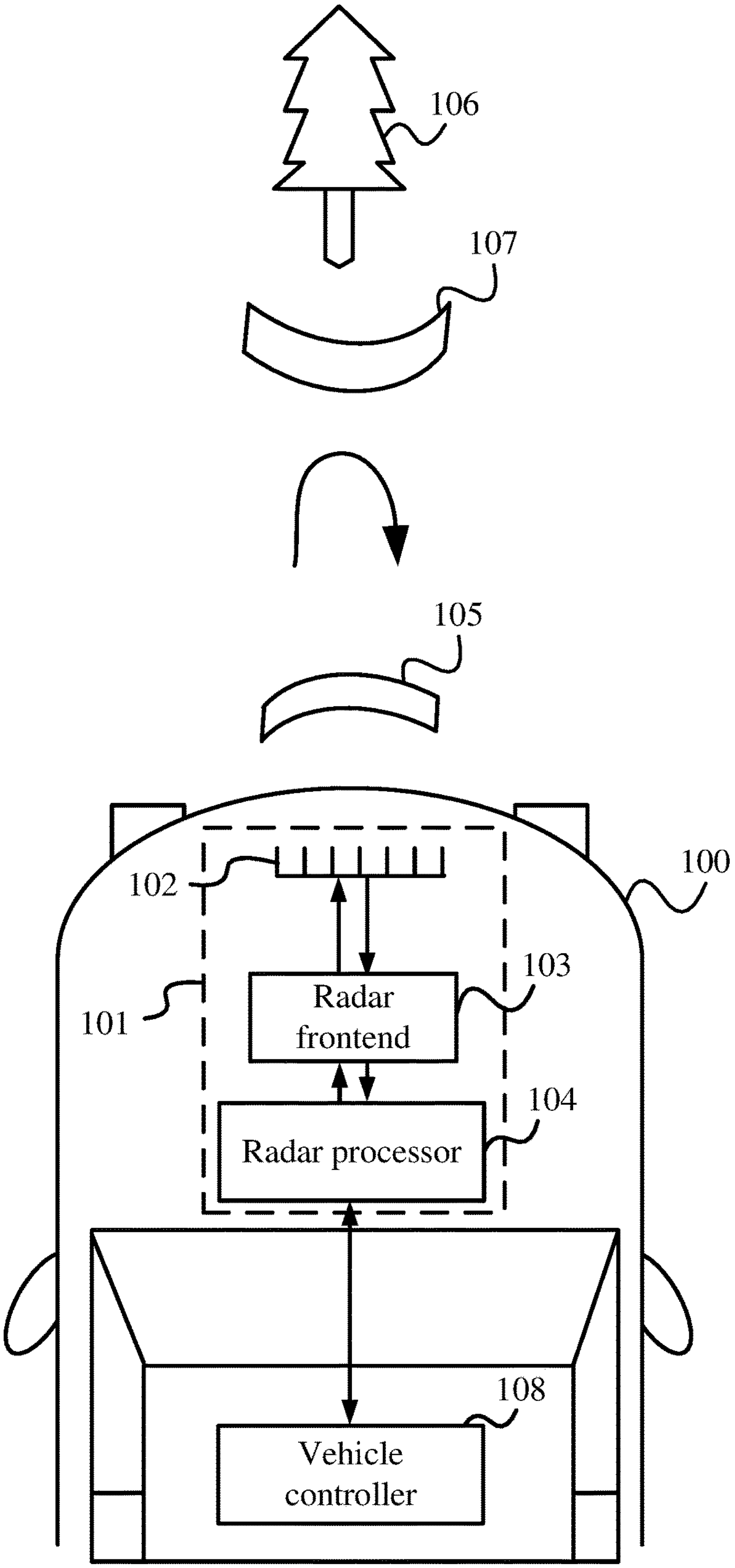
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, or design described herein as "exemplary" or "demonstrative" is not necessarily to be construed as preferred or advantageous over other aspects, or designs.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHZ, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include road users, such as other vehicles, pedestrians; road objects and markings, such as traffic signs, traffic lights, lane markings, road markings, road elements, e.g., a pavement-road meeting, a road edge, a road profile, road roughness (or smoothness); general objects, such as a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
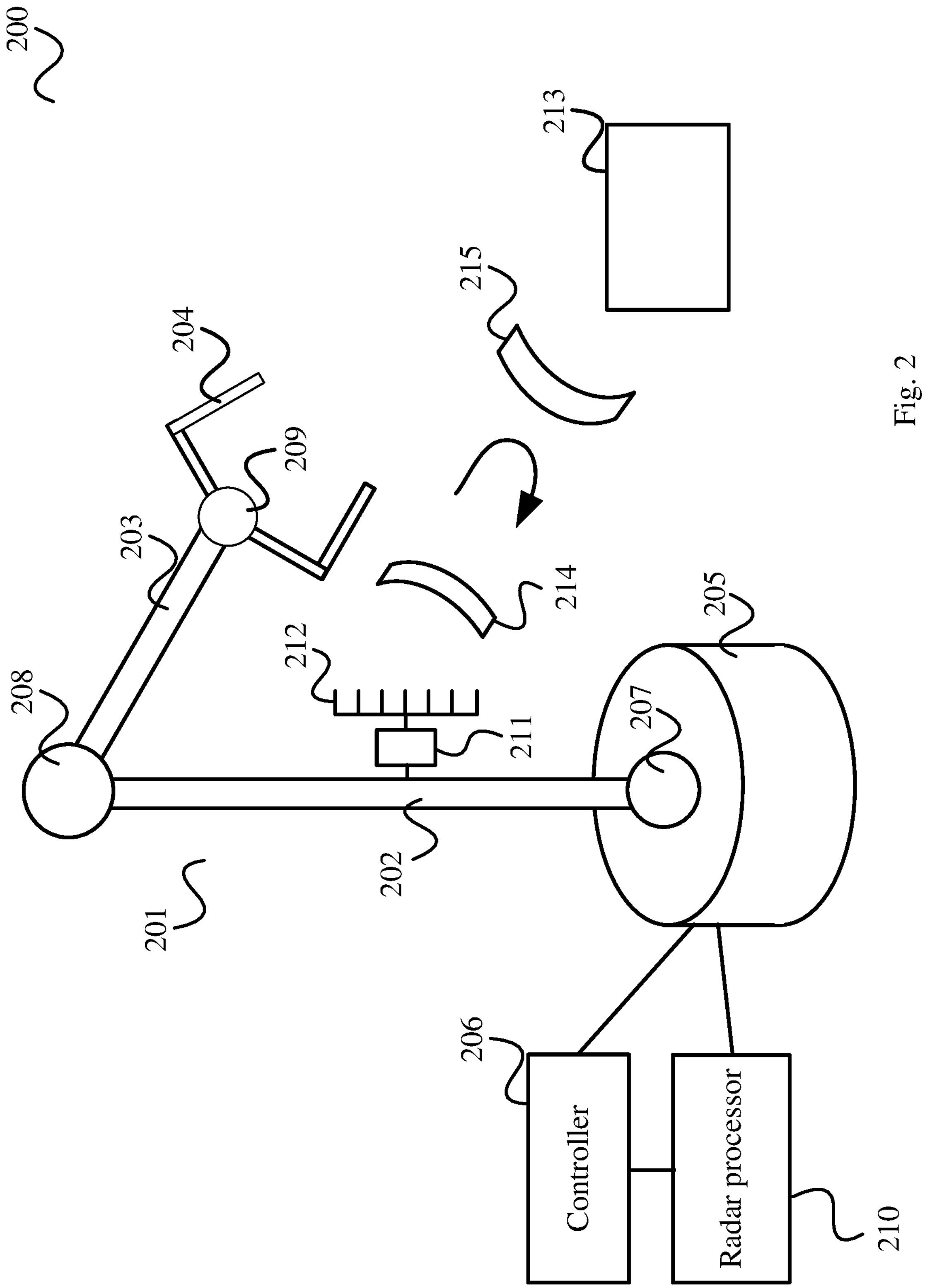
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
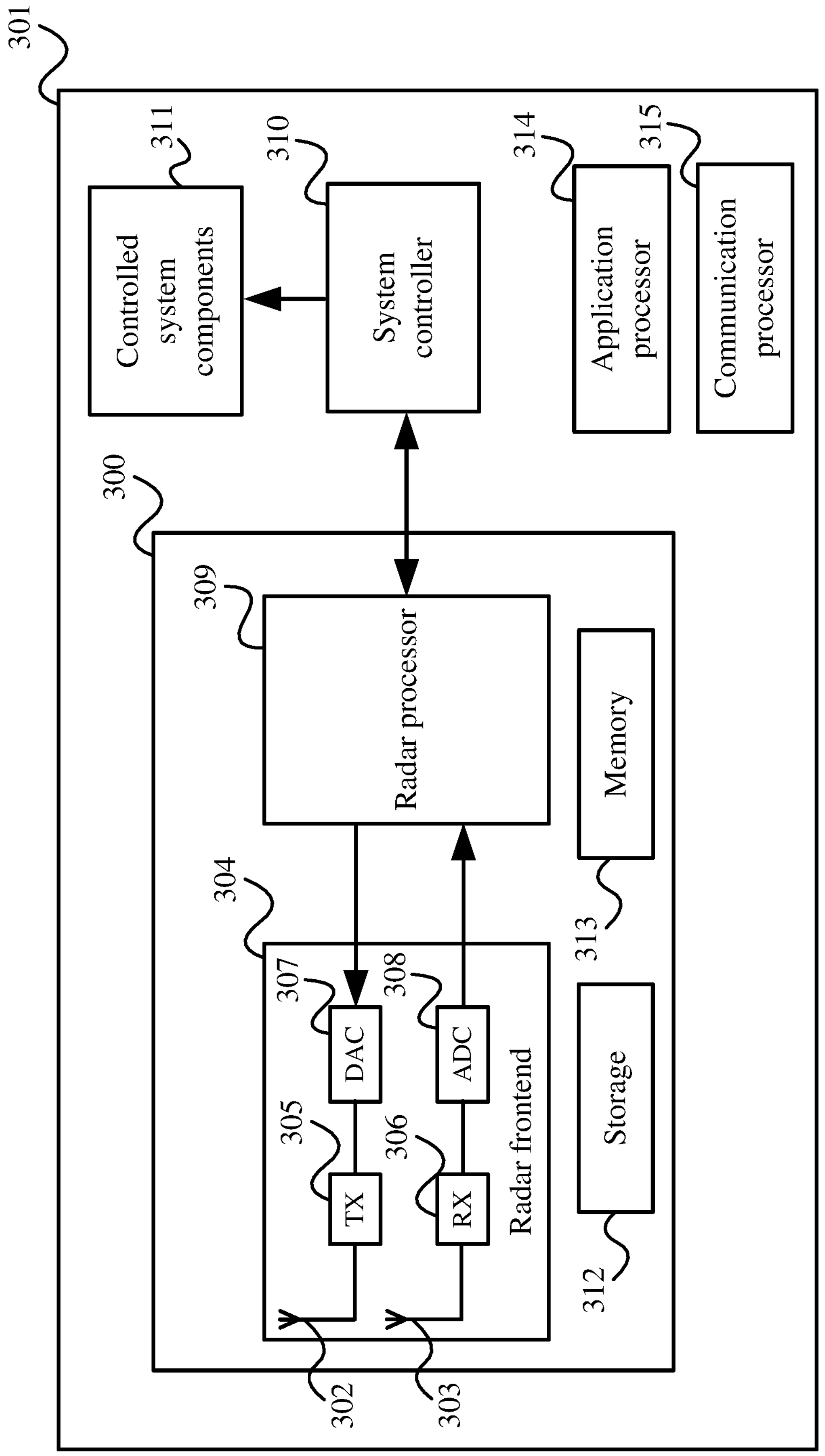
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, the radar information from radar processor 309 may be processed, e.g., by system controller 310 and/or any other element of system 301, for example, in combination with information from one or more other of information sources, for example, LiDAR information from a LiDAR processor, vision information from a vision-based processor, or the like.

In some demonstrative aspects, an environmental model of an environment of system 301 may be determined, e.g., by system controller 310 and/or any other element of system 301, for example, based on the radar information from radar processor 309, and/or the information from one or more other of information sources.

In some demonstrative aspects, a driving policy system, e.g., which may be implemented by system controller 310 and/or any other element of system 301, may process the environmental model, for example, to decide on one or more actions, which may be taken.

In some demonstrative aspects, system controller 310 may be configured to control one or more controlled system components 311 of the system 301, e.g. a motor, a brake, steering, and the like, e.g. by one or more corresponding actuators, for example, based on the one or more action decisions.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated Continuous Wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
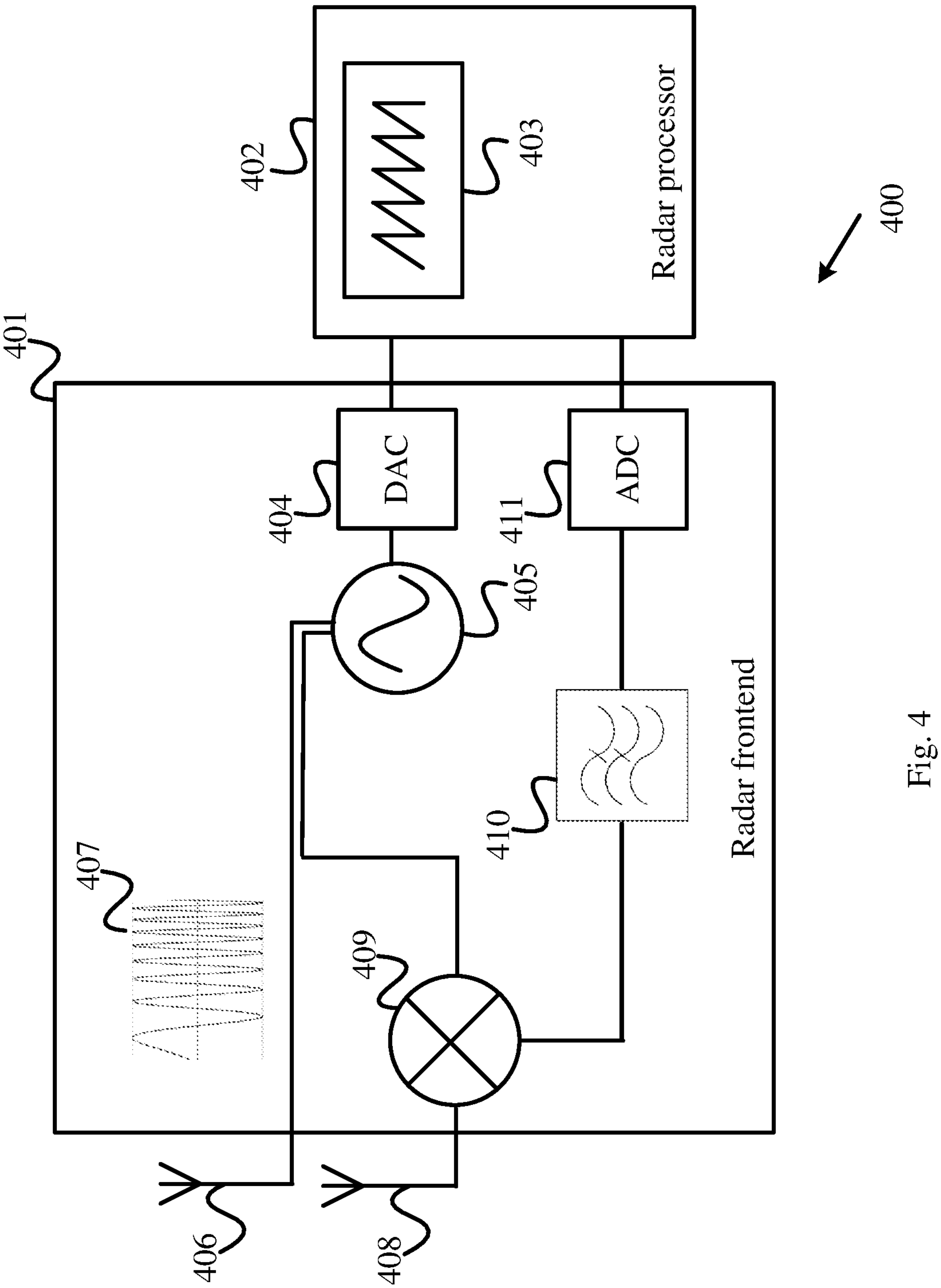
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, a radar device may be configured to utilize radio transmit signals having a form of chirps, e.g., chirps 407, for example, according to a chirp modulation, e.g., as described below.

In other aspects, the radar device may be configured to utilize radio transmit signals configured according to a Phase Modulation (PM), a digital modulation, an OFDM modulation, and/or any other suitable type of modulation.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
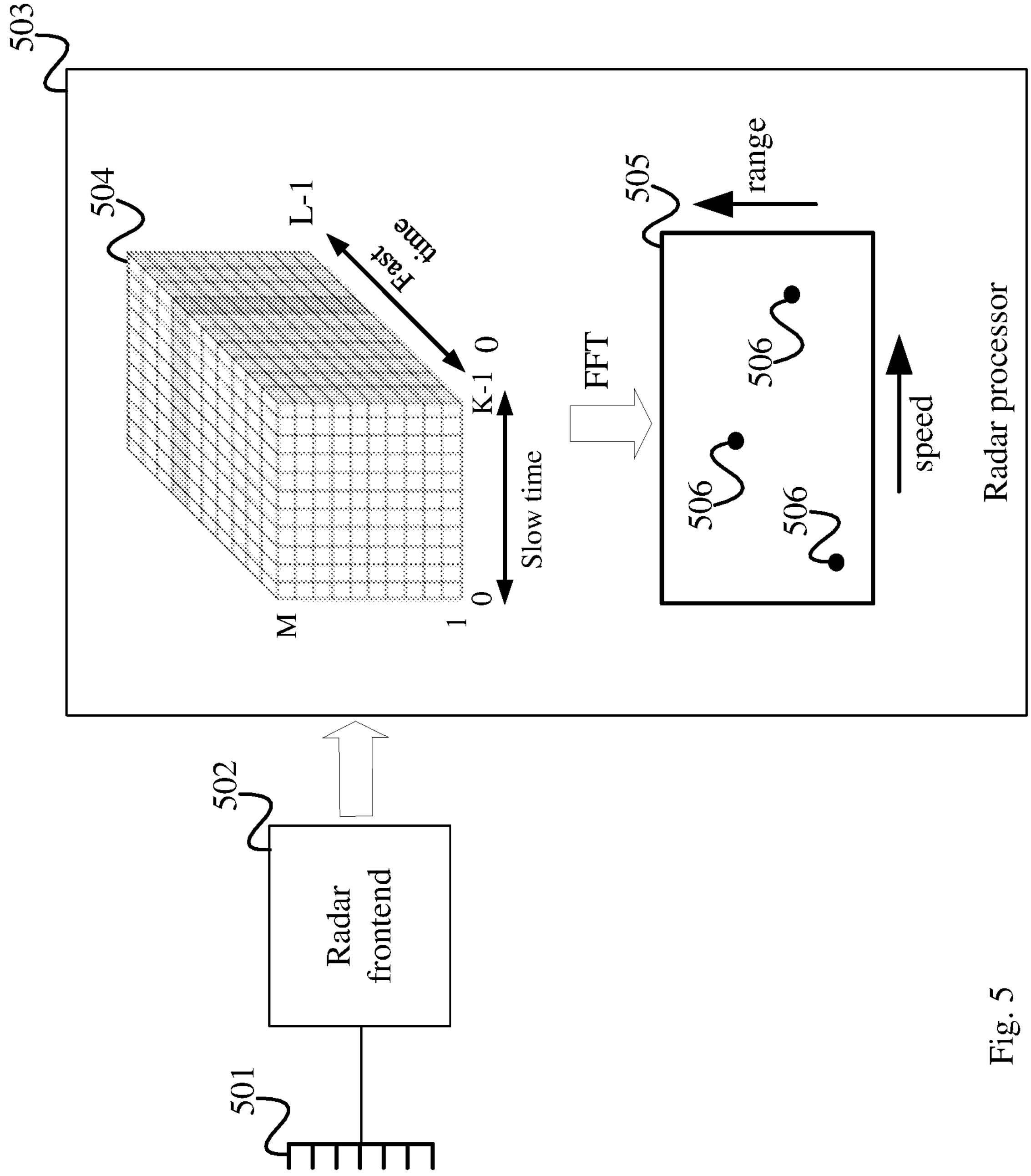
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time" direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time" direction of the data cube 504.

In some demonstrative aspects, processor 504 may be configured to determine the range values, Doppler values, and/or Angle of Arrival (AoA) values, e.g., Azimuth values and/or Elevation values, for example, based on FFT techniques, e.g., as described below.

In other aspects, processor 504 may be configured to determine the range values, Doppler values, and/or Angle of Arrival (AoA) values, e.g., Azimuth values and/or Elevation values, for example, based on Super-Resolution (SR) techniques, and/or any other suitable processing technique.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
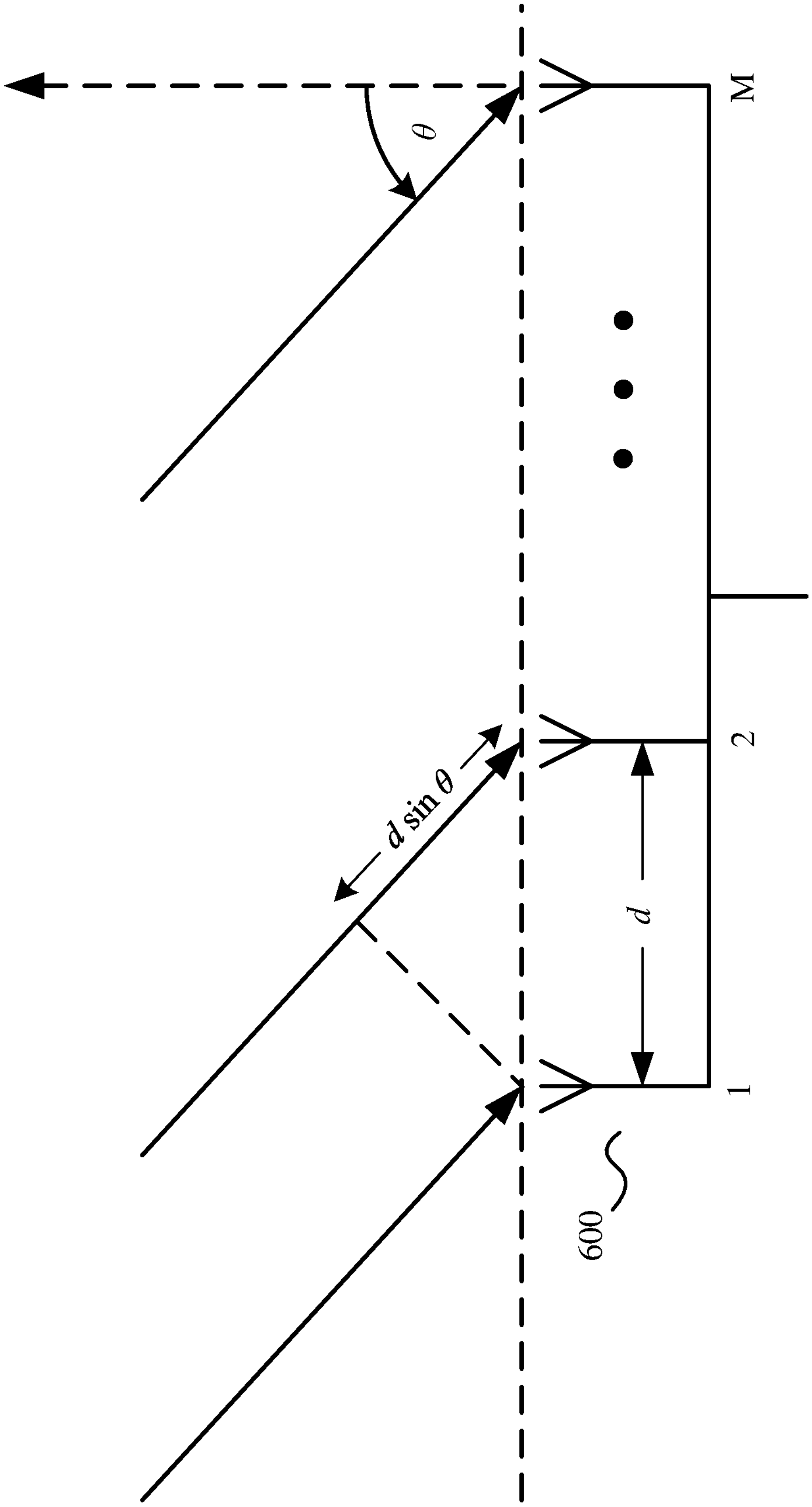
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted Δφ, between two antennas of the receive antenna array 600 may be determined, e.g., as follows:

$$\Delta\varphi = \frac{2\pi}{\lambda} \cdot d \cdot \sin(\theta)$$

wherein λ denotes a wavelength of the incoming radio signal, d denotes a distance between the two antennas, and θ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
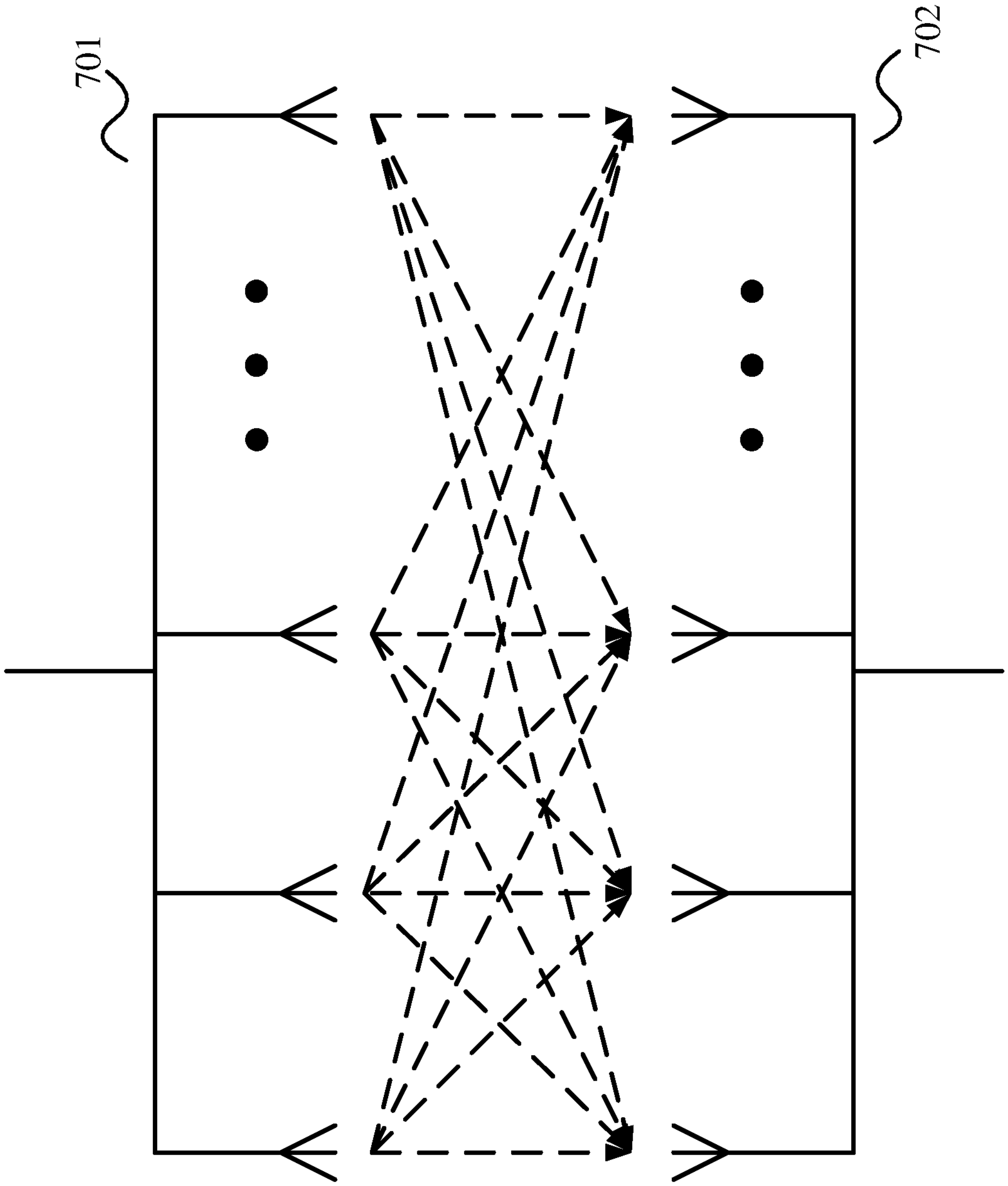
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
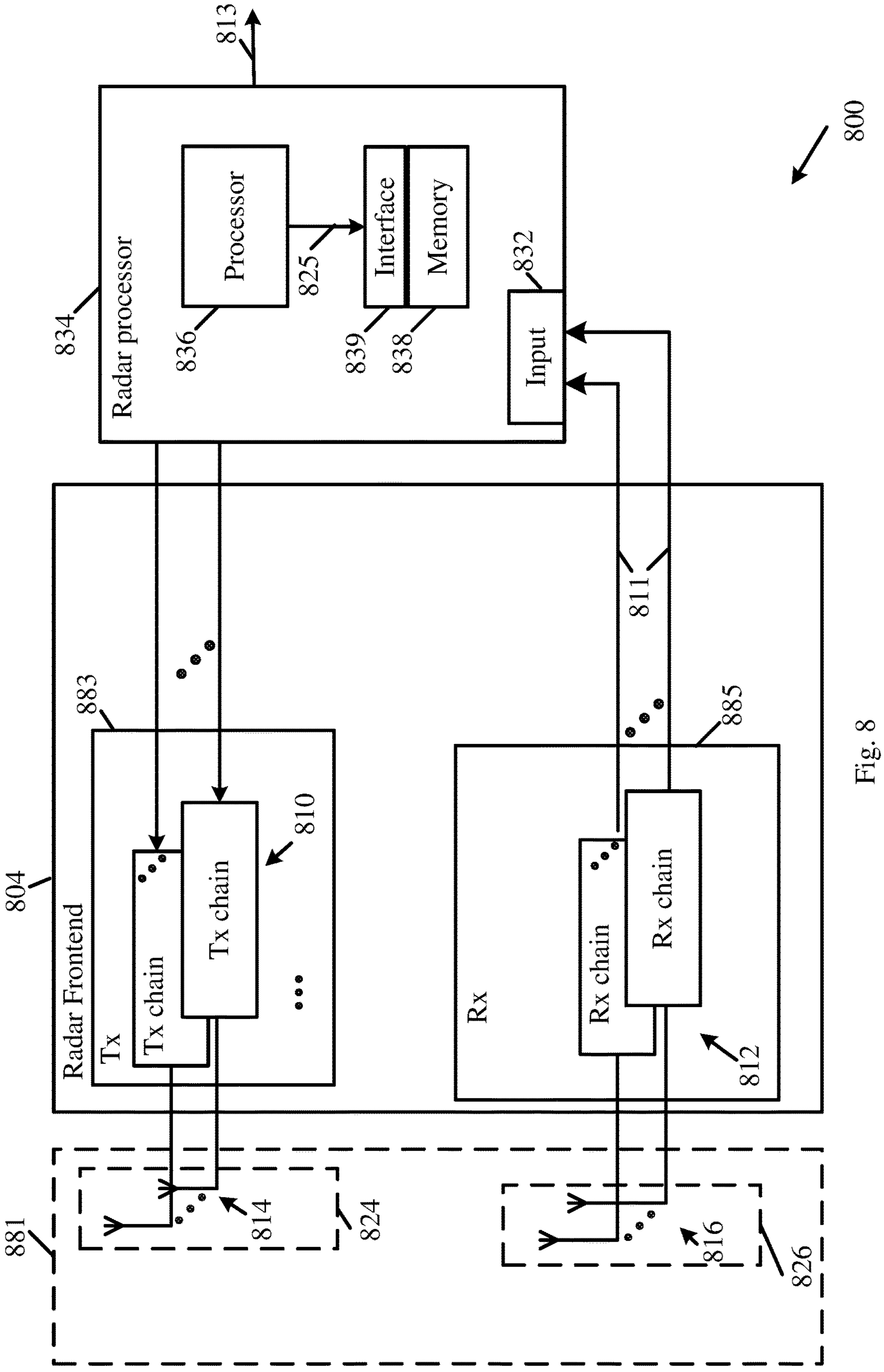
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which may be generated by processor 836, for example, based on the radar Rx data, the range information and/or Doppler information. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include additional information, which may be, for example, based on the raw point cloud estimations, and/or may be related to the raw point cloud estimations.

In some demonstrative aspects, the radar information 813 may include metadata information corresponding to the raw point cloud estimations.

In some demonstrative aspects, the radar information 813 may include, for example, information relating to a reliability level of the raw point cloud estimations, information relating to one or more parameters, conditions and/or criteria implemented in determining the raw point cloud estimations, and/or any other suitable additional or alternative information.

For example, the radar information 813 may include Log Likelihood Ratio (LLR) information corresponding to the raw point cloud estimations, Radar Cross Section (RCS) estimation information, SNR estimation information, and/or any other suitable additional or alternative information.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like. In one example, the PC2 information may be based on one or more temporal filtering techniques, which may be applied to the PC1 information, for example, for temporal filtering of multiple frames and/or multiple PC1 instances.

In some demonstrative aspects, the radar information 813 may include target tracking information corresponding to a plurality of targets in an environment of the radar device 800, e.g., as described below.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
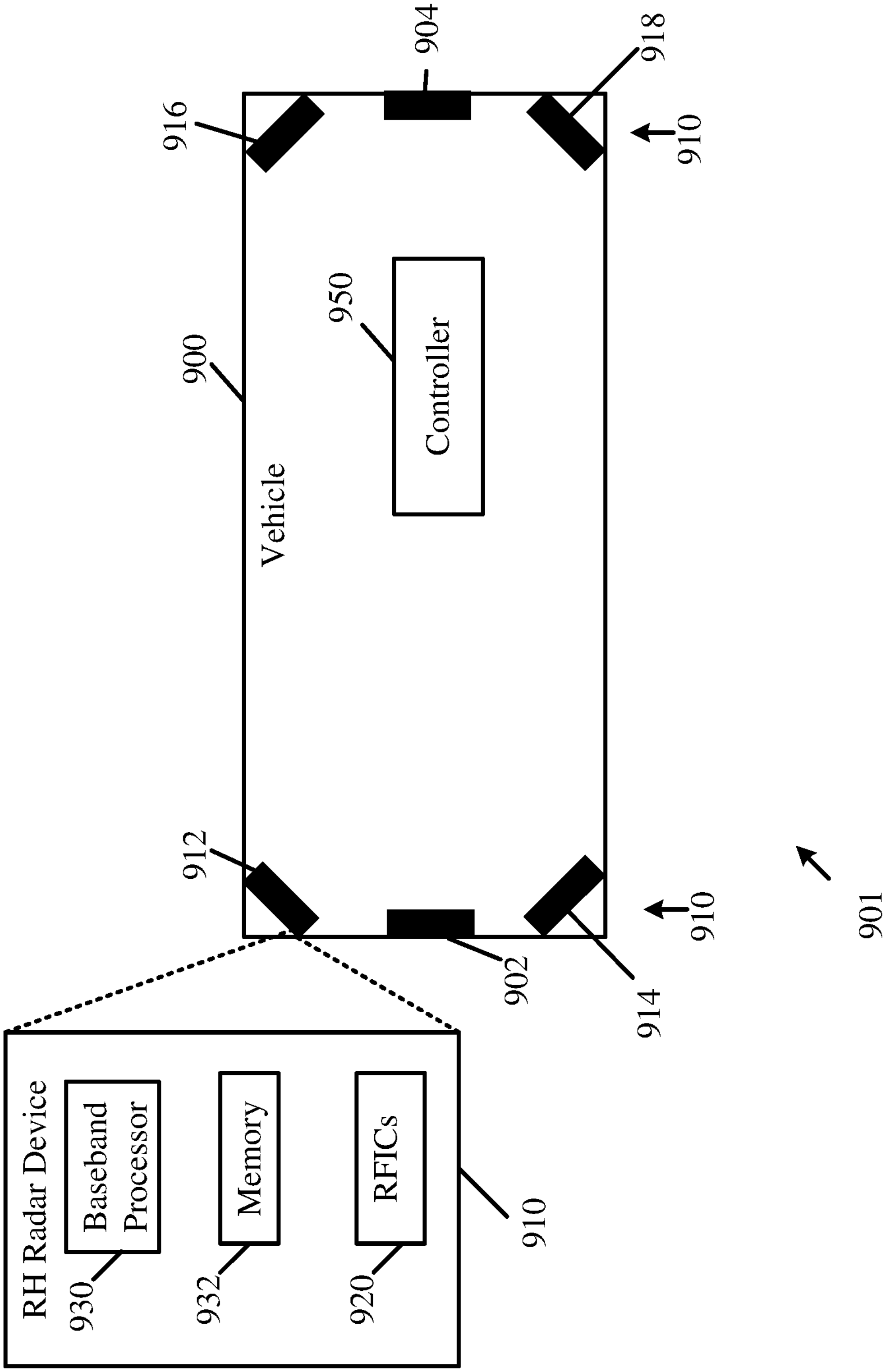
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of Radio Head (RH) radar devices (also referred to as RHs) 910 implemented in a vehicle 900, in accordance with some demonstrative aspects.

In some demonstrative aspects, as shown in FIG. 9, the plurality of RH radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of RH radar devices 910 may include, for example, six RH radar devices 910, e.g., as described below.

In some demonstrative aspects, the plurality of RH radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of RH radar devices 910 may include any other number of RH radar devices 910, e.g., less than six radar devices or more than six radar devices.

In other aspects, the plurality of RH radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first RH radar device 902, e.g., a front RH, at a front-side of vehicle 900.

In some demonstrative aspects, as shown in FIG. 9, vehicle 900 may include a second RH radar device 904, e.g., a back RH, at a back-side of vehicle 900.

In some demonstrative aspects, as shown in FIG. 9, vehicle 900 may include one or more of RH radar devices at one or more respective corners of vehicle 900. For example, vehicle 900 may include a first corner RH radar device 912 at a first corner of vehicle 900, a second corner RH radar device 914 at a second corner of vehicle 900, a third corner RH radar device 916 at a third corner of vehicle 900, and/or a fourth corner RH radar device 918 at a fourth corner of vehicle 900.

In some demonstrative aspects, vehicle 900 may include one, some, or all, of the plurality of RH radar devices 910 shown in FIG. 9. For example, vehicle 900 may include the front RH radar device 902 and/or back RH radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the RH radar devices 910.

In some demonstrative aspects, at least part of the functionality of radar system controller 950 may be implemented by a dedicated controller, e.g., a dedicated system controller or central controller, which may be separate from the RH radar devices 910, and may be configured to control some or all of the RH radar devices 910.

In some demonstrative aspects, at least part of the functionality of radar system controller 950 may be implemented as part of at least one RH radar device 910.

In some demonstrative aspects, at least part of the functionality of radar system controller 950 may be implemented by a radar processor of an RH radar device 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, an RH radar device 910 of the plurality of RH radar devices 910, may include a baseband processor 930 (also referred to as a "Baseband Processing Unit (BPU)"), which may be configured to control communication of radar signals by the RH radar device 910, and/or to process radar signals communicated by the RH radar device 910. For example, baseband processor 930 may include one or more elements of radar processor 834 (FIG. 8), and/or may perform one or more operations and/or functionalities of radar processor 834 (FIG. 8).

In other aspects, an RH radar device 910 of the plurality of RH radar devices 910 may exclude one or more, e.g., some or all, functionalities of baseband processor 930. For example, controller 950 may be configured to perform one or more, e.g., some or all, functionalities of the baseband processor 930 for the RH.

In one example, controller 950 may be configured to perform baseband processing for all RH radar devices 910, and all RH radio devices 910 may be implemented without baseband processors 930.

In another example, controller 950 may be configured to perform baseband processing for one or more first RH radar devices 910, and the one or more first RH radio devices 910 may be implemented without baseband processors 930; and/or one or more second RH radar devices 910 may be implemented with one or more functionalities, e.g., some or all functionalities, of baseband processors 930.

In another example, one or more, e.g., some or all, RH radar devices 910 may be implemented with one or more functionalities, e.g., partial functionalities or full functionalities, of baseband processors 930.

In some demonstrative aspects, baseband processor 930 may include one or more components and/or elements configured for digital processing of radar signals communicated by the RH radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, RH radar device 910 may include a memory 932, which may be configured to store data processed by, and/or to be processed by, baseband processor 930. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In other aspects, an RH radar device 910 of the plurality of RH radar devices 910 may exclude memory 932. For example, the RH radar device 910 may be configured to provide radar data to controller 950, e.g., in the form of raw radar data.

In some demonstrative aspects, as shown in FIG. 9, RH radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, a radar device, e.g., as described above with reference to FIGS. 1-9, may be configured to implement one or more operations and/or functionalities of a processing mechanism, which may be configured to provide a technical solution to support efficient and/or flexible processing of radar data, e.g., as described below.

In some demonstrative aspects, the processing mechanism may be configured to provide a technical solution to support efficient and/or flexible a multi-dimensional array transpose, e.g., as described below.

In some demonstrative aspects, the processing mechanism may be configured to provide a technical solution to support data processing corresponding to an automotive radar algorithmic data path, e.g., as described below.

In some demonstrative aspects, in some use cases, scenarios, and/or implementations, an automotive radar algorithmic data path may provide one or more technical challenges, e.g., as described below.

In some demonstrative aspects, an automotive radar algorithmic data path may implement a frame size of a radar frame, which may be relatively large, e.g., in the order of 4 Gigabit (Gb). In other aspects, any other suitable frame size may be implemented.

In some demonstrative aspects, the automotive radar algorithmic data path may implement a received data Bandwidth (BW), which may be in the order of 240 Gb per second (Gbps). In other aspects, any other suitable data BW may be implemented.

For example, the radar frame may be four-dimensional, e.g., including samples associated with an array of ranges, chirps, Tx antennas and/or Rx antennas.

In some demonstrative aspects, an algorithmic stage in the automotive radar algorithmic data path, e.g., each algorithmic stage, may 'walk' on the radar frame and may process the radar frame, e.g., according to a different dimension of the radar frame.

For example, the radar frame may be arranged in a memory according to a specific dimension, e.g., a range dimension. Accordingly, when processing is performed on a different dimension, e.g., a Doppler dimension, it may be required to fetch data according to the different dimension, for example, from scattered memory locations in the memory, and to re-arrange the data according to the different dimension.

For example, in a high-BW application, when data buses and memories are wide, for example, such that each memory entry includes multiple elements, there may be a need to further rearrange the elements within memory entries.

For example, using Software (SW) for rearranging the elements within memory entries may add significant processing overhead, which in turn, may adversely affect related product Key performance indicators (KPIs), such as an area, a power consumption, a latency, and/or the like.

For example, a hardware (HW) implementation utilizing HW, for example, tailored Hardware (HW), e.g., hard-coded HW, for rearranging the elements within memory entries, may consume engineering resources and/or may increase project schedule and/or cost. For example, a tailored hard-coded HW solution for rearranging data within entries in an algorithmic engine, e.g., in each algorithmic engine, based on its specific needs, may increase engineering resources, project schedule and/or cost.

In some demonstrative aspects, in some use cases, and/or scenarios, there may be one or more technical inefficiencies, disadvantages and/or problems in implementing HW-based Direct Memory Access (DMA) engines to support read/write operations from scattered locations, for example, according to a list of descriptors or pre-defined patterns.

For example, the HW-based DMA engines may not be able to support rearranging elements within a memory entry, and as such, a benefit of the HW-based DMA engines may be limited.

In some demonstrative aspects, a radar device, e.g., as described above with reference to FIGS. 1-9, may be configured to implement one or more operations and/or functionalities of a processing module (also referred to as a "Data Mover and Transformer (DMT)"), which may be configured to perform an array transpose, for example, an on-the-fly array transpose, e.g., as described below.

In some demonstrative aspects, the DMT may be configured to perform a multi-dimensional array transpose, e.g., as described below.

In some demonstrative aspects, the DMT may be configured to perform a two-dimensional (2D) array (2D-array) transpose, e.g., as described below.

In other aspects, DMT may be configured to perform a three-dimensional (3D) array transpose, four-dimensional (4D) array transpose, a five-dimensional (5D) array transpose, and/or any other multi-dimensional array transpose.

In some demonstrative aspects, a radar device, e.g., as described above with reference to FIGS. 1-9, may be configured to implement one or more operations and/or functionalities of a DMT, which may be configured to perform the array transpose, for example, while moving data from a first memory location to a second memory location, e.g., as described below.

For example, the DMT may be configured to perform the array transpose, for example, while moving data from a DDR to a DSP, e.g., as described below.

In other aspects, the DMT may be configured to perform the array transpose while moving the data between any other memory locations and/or memories.

In some demonstrative aspects, the DMT may be configured to provide a technical solution to support an array transpose of an array, e.g., a relatively large array, for example, by performing an internal transpose on one or more relatively smaller sub-arrays of the array, e.g., as described below.

In some demonstrative aspects, the DMT may be configured to provide a technical solution to support the array transpose, for example, even for substantially any array size, e.g., as an internal transpose may be performed on one or more smaller sub-arrays, e.g., as described below.

In some demonstrative aspects, the DMT may be configured to utilize internal double-buffer arrays, for example, to meet a full bus BW, e.g., as described below.

In some demonstrative aspects, the DMT may be configured to utilize pre-configured and/or multi-dimensional address patterns, e.g., at a source memory location and/or a destination memory location, for example, to support an array transpose to multi-dimensional arrays, e.g., as described below.

In some demonstrative aspects, the DMT may be configured to utilize pre-configured and/or multi-dimensional address patterns, for example, to provide high flexibility in data arrangement at the source memory location and/or the destination memory location, e.g., as described below.

In some demonstrative aspects, the DMT may be configured to provide a technical solution to support a DMT array transpose for any suitable application. For example, the DMT array transpose may be, for example, independent from an algorithmic logic, e.g., the automotive radar algorithmic data path. For example, the DMT may provide a technical solution to support a common data movement solution that can fit many applications.

In some demonstrative aspects, the DMT may be configured to provide a technical solution to support a high-BW DMA, for example, between algorithmic stages in a radar processing path, e.g., the automotive radar algorithmic data path, for example, while performing on-the-fly array rearrangement of an array to a desired dimension of the array at the destination, e.g., as described below.

In some demonstrative aspects, the DMT may be configured to provide a technical solution for HW-based algorithmic engines, for example, to save a need for a proprietary data arrangement solution.

In some demonstrative aspects, the DMT may be configured to provide a technical solution for HW-based algorithmic engines, for example, to reduce a development schedule.

In some demonstrative aspects, the DMT may be configured to provide a technical solution for SW-based engines, for example, to offload a rearrangement task from a memory processor e.g., a DSP, and, as a result, may significantly improve power consumption and/or latency.

In some demonstrative aspects, a radar system, e.g., as described above with reference to FIGS. 1-9, may be configured to implement one or more operations and/or functionalities of a DMT, e.g., as described below.

Figure 10:
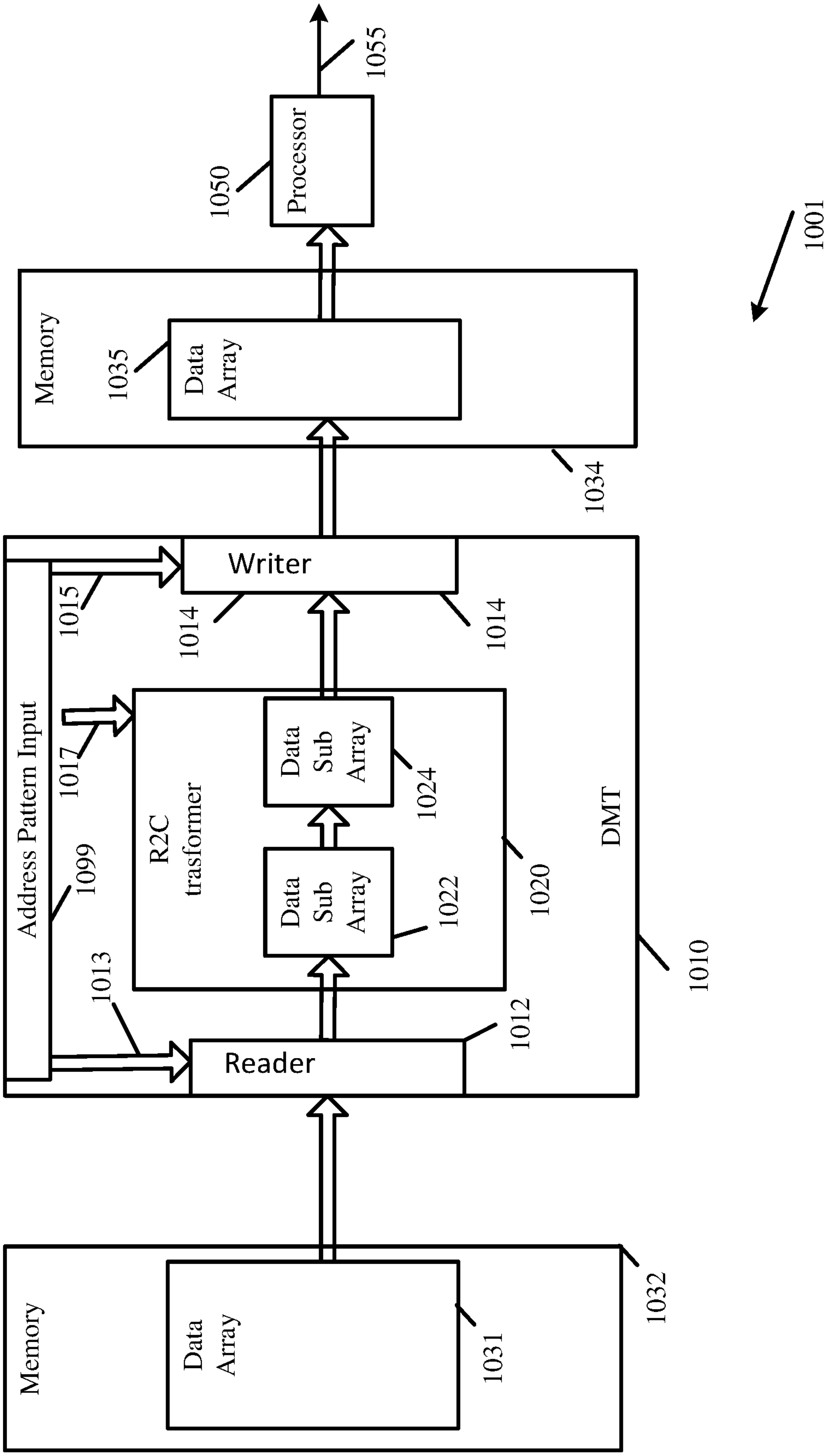
FIG. 10 is a schematic illustration of a system including a Data Mover and Transformer (DMT), in accordance with some demonstrative aspects.

Reference is made to FIG. 10, which schematically illustrates a system 1001 including a DMT 1010, in accordance with some demonstrative aspects.

In some demonstrative aspects, DMT 1010 may be configured to transform a first data array 1031 retrieved from a first memory 1032, for example, into a second data array 1035, for example, to be stored in a second memory 1034, e.g., as described below.

In some demonstrative aspects, as shown in FIG. 10, DMT 1010 may include a Row to Column (R2C) transformer 1020, which may be configured to transform a data sub-array 1022 into a transformed data sub-array 1024, e.g., as described below.

In some demonstrative aspects, R2C transformer 1020 may be configured to transform the data sub-array 1022 into the transformed data sub-array 1024, for example, by transforming one or more rows of the data sub-array 1022 into one or more respective columns of the transformed data sub-array 1024 e.g., as described below.

In some demonstrative aspects, as shown in FIG. 10, DMT 1010 may include a memory reader 1012, which may be configured to populate the data sub-array 1022 with data retrieved from the first memory 1032, for example, according to a memory read pattern, e.g., as described below.

In some demonstrative aspects, the memory read pattern may be based, for example, on a predefined transformation from the first data array 1031 to the second data array 1035, e.g., as described below.

In some demonstrative aspects, as shown in FIG. 10, DMT 1010 may include a memory writer 1014, which may be configured to write data from the transformed data sub-array 1024 to the second memory 1034, for example, according to a memory write pattern, e.g., as described below.

In some demonstrative aspects, the memory write pattern may be based, for example, on the predefined transformation from the first data array 1031 to the second data array 1035, e.g., as described below.

In some demonstrative aspects, as shown in FIG. 10, system 1001 may include a processor 1050, which may be configured to generate processed information 1055, for example, based on the second data array 1035 in the second memory 1034, e.g., as described below.

In some demonstrative aspects, as shown in FIG. 10, processor 1050 may be configured to generate processed information 1055, e.g., including radar information 1055, for example, based on the second data array 1035 in the second memory 1034, e.g., as described below.

For example, radar processor 834 (FIG. 8) may include one or more elements of processor 1050, and/or may perform one or more operations and/or functionalities of processor 1050; and/or BB processor 930 (FIG. 9) may include one or more elements of processor 1050, and/or may perform one or more operations and/or functionalities of processor 1050.

In some demonstrative aspects, first data array 1031 in the first memory 1032 may include, for example, first processed radar data arranged in the first data array 1031, for example, according to a first radar-processing dimension, e.g., as described below.

In some demonstrative aspects, the second data array 1035 may be arranged, for example, according to a second radar-processing dimension to be processed by the processor 1050, e.g., as described below.

In some demonstrative aspects, processor 1050 may be configured to generate second processed radar data, for example, by processing data from the second data array 1035 according to the second radar-processing dimension, e.g., as described below.

In some demonstrative aspects, processor 1050 may be configured to store the second processed radar data in a third data array (not shown in FIG. 10) in the first memory 1032, e.g., as described below.

In some demonstrative aspects, processor 1050 may be configured to configure the DMT 1010 to transform the third data array from the first memory 1032, for example, into a fourth data array (not shown in FIG. 10) to be stored in the second memory 1034, e.g., as described below.

In some demonstrative aspects, the fourth data array may be arranged according to a third radar-processing dimension to be processed by the processor 1050, e.g., as described below.

In some demonstrative aspects, the second radar-processing dimension may be different from the first radar-processing dimension, e.g., as described below.

In some demonstrative aspects, the third radar-processing dimension is different from the second radar-processing dimension, e.g., as described below.

For example, first data array 1031 in the first memory 1032 may be arranged, for example, according to a range dimension, and/or second data array 1035 in the second memory 1034 may be arranged, for example, according to a Doppler dimension.

For example, the third in the first memory 1032 may be arranged, for example, according to an azimuth dimension, and/or the fourth data array in the second memory 1034 may be arranged, for example, according to an azimuth dimension.

In other aspects, first data array 1031 in the first memory 1032 and/or second data array 1035 in the second memory 1034 may be arranged according to any other suitable radar-processing dimensions.

In some demonstrative aspects, one or more elements of system 1000, e.g., DMT 1010 and/or processor 1050, may be implemented as part of a radar device or system, for example, as part of radar device 800 (FIG. 8) and/or radar system 901 (FIG. 9), e.g., as described above. For example, processor 1050 may be configured to generate the processed information 1055 based on any suitable radar processing techniques.

In other aspects, one or more elements of system 1000, e.g., DMT 1010 and/or processor 1050, may be implemented as part of any other suitable device and/or system.

For example, in some demonstrative aspects, one or more elements of system 1000, e.g., DMT 1010 and/or processor 1050, may be implemented as part of a computing device and/or system, which may be configured to provide processed information 1055 based on any suitable predefined transformation from the first data array 1031 to the second data array 1035.

In some demonstrative aspects, the first data array 1031 may include two or more dimensions, e.g., as described below.

In some demonstrative aspects, the second data array 1035 may include two or more dimensions, e.g., as described below.

In some demonstrative aspects, each of the first data array 1031 and the second data array 1035 may include two or more dimensions, e.g., as described below.

In some demonstrative aspects, DMT 1010 may be configured to configure a count of the rows in the data sub-array 1022 and/or a count of the columns in the data sub-array 1022, for example, based on input R2C configuration information 1017, e.g., as described below.

In some demonstrative aspects, the count of the rows in the data sub-array 1022 and/or the count of the columns in the data sub-array 1022 may be configured, for example, based on an element size of a data element in the first data array 1031, e.g., as described below.

In some demonstrative aspects, the count of the rows in the data sub-array 1022 may be based, for example, on a memory entry size of the first memory 1032, e.g., as described below.

In some demonstrative aspects, the count of the rows in the data sub-array 1022 may be based, for example, on a count of data elements of the first data array 1031 per memory entry of the first memory 1032, e.g., as described below.

In some demonstrative aspects, the count of the columns in the data sub-array 1022 may be based, for example, on a memory entry size of the second memory 1034, e.g., as described below.

In some demonstrative aspects, the count of the columns in the data sub-array 1022 may be based, for example, on a count of data elements of the second data array 1035 per memory entry of the second memory 1034, e.g., as described below. In other aspects, the count of the rows in the data sub-array 1022 and/or the count of the columns in the data sub-array 1022 may be configured based on any other additional or alternative parameter and/or attribute corresponding to the first data array 1031, the second data array 1035, the first memory 1032, the second memory 1034, and/or any other suitable additional or alternative parameter, attribute and/or condition.

In some demonstrative aspects, DMT 1010 may be configured to transform the first data array 1031 into the second data array 1035, for example, by performing a sequence of read/write cycles, e.g., as described below.

In some demonstrative aspects, DMT 1010 may be configured to perform a read/write cycle of the sequence of read/write cycles, e.g., as described below.

In some demonstrative aspects, the read/write cycle of the sequence of read/write cycles may include populating the one or more rows of the data sub-array 1022 by one or more respective memory entries retrieved by the memory reader 1012 from the first memory 1032, for example, according to the memory read pattern, e.g., as described below.

For example, DMT 1010 may be configured to populate the one or more rows of the data sub-array 1022 by the one or more respective memory entries retrieved by the memory reader 1012 from the first memory 1032, for example, according to the memory read pattern, e.g., as described below.

In some demonstrative aspects, the read/write cycle of the sequence of read/write cycles may include transforming the one or more rows of the data sub-array 1022 into the one or more respective columns of the transformed data sub-array 1024, e.g., as described below.

For example, DMT 1010 may be configured to transform the one or more rows of the data sub-array 1022 into the one or more respective columns of the transformed data sub-array 1024, e.g., as described below.

In some demonstrative aspects, the read/write cycle of the sequence of read/write cycles may include writing data from one or more rows of the transformed data sub-array 1024 to one or more respective memory entries of the second memory 1034, for example, according to the memory write pattern, e.g., as described below.

For example, DMT 1010 may be configured to write the data from the one or more rows of the transformed data sub-array 1024 to the one or more respective memory entries of the second memory 1034, for example, according to the memory write pattern, e.g., as described below.

In some demonstrative aspects, DMT 1010 may include an input 1099, e.g., including an address pattern input 1099, to input read pattern information 1013 and/or write pattern information 1015, e.g., as described below.

In some demonstrative aspects, memory reader 1012 may be configured to determine the memory read pattern, for example, based on the read pattern information 1013, e.g., as described below.

In some demonstrative aspects, memory writer 1014 may be configured to determine the memory write pattern, for example, based on the write pattern information 1015, e.g., as described below.

In some demonstrative aspects, the read pattern information 1013 may include, for example, read sub-address information to define a plurality of read sub-address sequences, e.g., as described below.

In some demonstrative aspects, the memory read pattern may be based, for example, on a combination of the plurality of read sub-address sequences, e.g., as described below.

In some demonstrative aspects, the memory read pattern may be based, for example, on a summation of the plurality of read sub-address sequences, e.g., as described below.

In other aspects, the memory read pattern may be based, for example, on any other suitable combination and/or function applied to the plurality of read sub-address sequences.

In some demonstrative aspects, the write pattern information 1015 may include, for example, write sub-address information to define a plurality of write sub-address sequences, e.g., as described below.

In some demonstrative aspects, the memory write pattern may be based, for example, on a combination of the plurality of write sub-address sequences, e.g., as described below.

In some demonstrative aspects, the memory write pattern may be based, for example, on a summation of the plurality of write sub-address sequences, e.g., as described below.

In other aspects, the memory write pattern may be based, for example, on any other suitable combination and/or function applied to the plurality of write sub-address sequences.

In some demonstrative aspects, the read sub-address information and/or the write sub-address information may include at least one sub-address parameter set, for example, to define at least one sub-address sequence, respectively, e.g., as described below.

In some demonstrative aspects, the sub-address parameter set may include, for example, a period parameter, e.g., as described below.

In some demonstrative aspects, the period parameter may define a first count of memory transactions, for example, after which a value of the sub-address sequence is to be updated, e.g., as described below.

In some demonstrative aspects, the sub-address parameter set may include, for example, a step parameter, e.g., as described below.

In some demonstrative aspects, the step parameter may define, for example, a step to increment the value of the sub-address sequence at an update, e.g., as described below.

In some demonstrative aspects, the sub-address parameter set may include, for example, a wrap parameter, e.g., as described below.

In some demonstrative aspects, the wrap parameter may define, for example, a wrap operation to return the sub-address sequence to a wrap address, e.g., as described below.

In some demonstrative aspects, the wrap parameter may include a wrap period, e.g., as described below.

In some demonstrative aspects, the wrap period may define a second count of memory transactions after which, for example, the sub-address sequence is to be returned to the wrap address, e.g., as described below.

In some demonstrative aspects, the wrap parameter may include a wrap value, e.g., as described below.

In some demonstrative aspects, the wrap value may define a predefined memory address at which, for example, the sub-address sequence is to be returned to the wrap address, e.g., as described below.

In some demonstrative aspects, the wrap address may include an initial address of the sub-address sequence, e.g., as described below.

In some demonstrative aspects, the wrap address may include a predefined wrap address different from the initial address of the sub-address sequence, e.g., as described below.

In other aspects, the wrap address may include any other address.

In other aspects, the wrap parameter may include any other additional or alternative parameter to define the wrap operation.

In other aspects, the sub-address parameter set may include any other additional and/or alternative parameters.

In some demonstrative aspects, DMT 1010 may be configured to provide a technical solution to support a high-BW array transpose, for example, while moving data from one algorithmic engine to another algorithmic engine or to a memory, e.g., as described above.

In some demonstrative aspects, DMT 1010 may be configured to provide a technical solution to support a performance increase, e.g., a significant performance increase, reducing chip area, and/or reduced power consumption.

Figure 11:
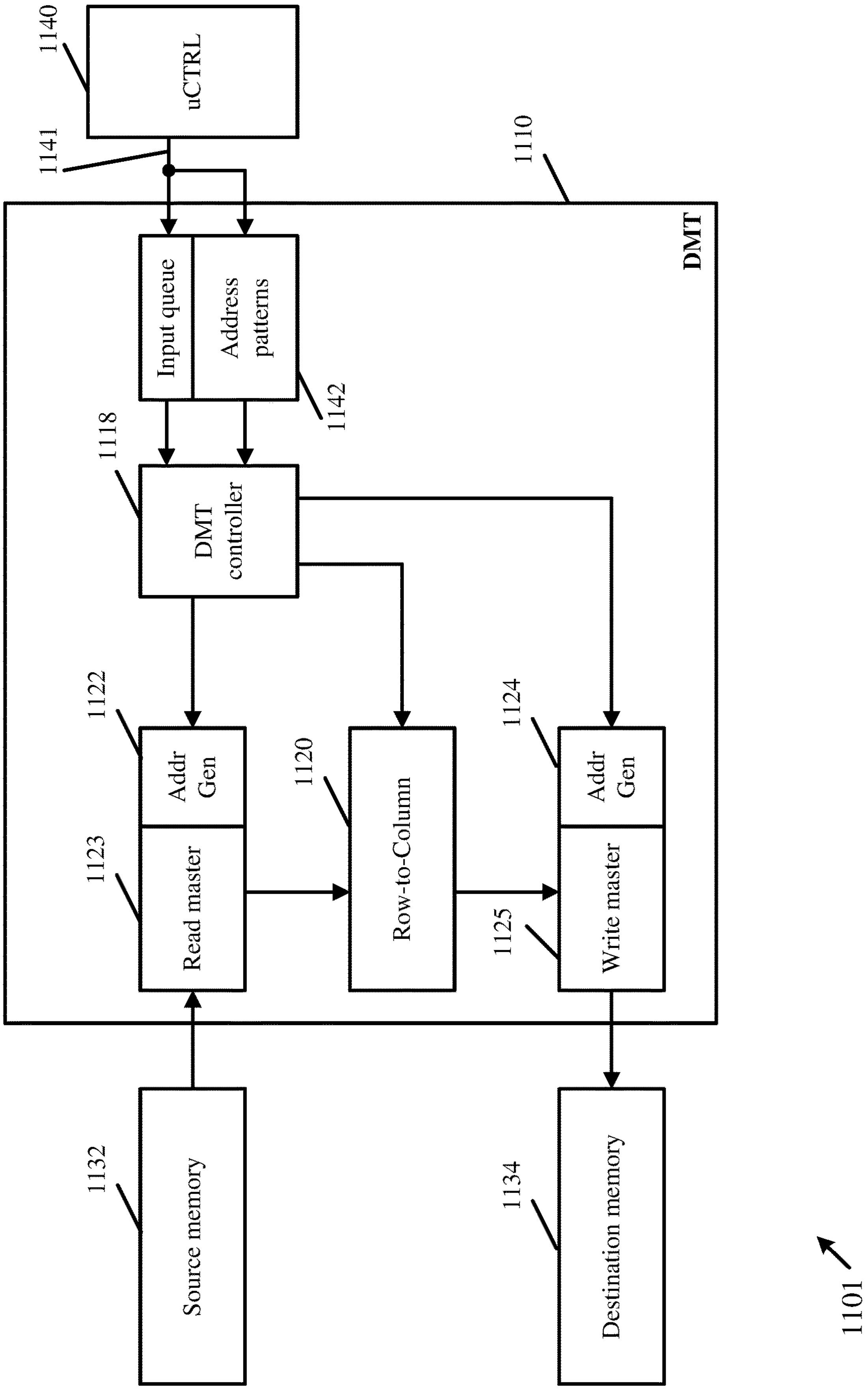
FIG. 11 is a schematic illustration of a system including a DMT, in accordance with some demonstrative aspects.

Reference is made to FIG. 11, which schematically illustrates a system 1101 including a DMT 1110, in accordance with some demonstrative aspects.

For example, system 1001 (FIG. 10) may include one or more elements of system 1101, and/or may perform one or more operations and/or functionalities of system 1101.

For example, DMT 1010 (FIG. 10) may include one or more elements of DMT 1110, and/or may perform one or more operations and/or functionalities of DMT 1110.

In some demonstrative aspects, DMT 1110 may be implemented, for example, using one or more elements and/or functionalities of a DMA, which may be configured, for example, with one or more enhancements, e.g., as described below.

In some demonstrative aspects, DMT 1110 may be configured to transform a first data array retrieved from a source memory 1132 into a second data array to be stored in a destination memory 1134, e.g., as described below.

In some demonstrative aspects, DMT 1110 may include a memory reader 1123, which may be configured to retrieve data from the source memory 1132, for example, according to a memory read pattern, which may be based, for example, on a predefined transformation from the first data array to the second data array, e.g., as described below.

In some demonstrative aspects, DMT 1110 may include a memory writer 1125, which may be configured to write data to the destination memory 1134, for example, according to a memory write pattern, which may be based, for example, on the predefined transformation from the first data array to the second data array, e.g., as described below.

In some demonstrative aspects, DMT 1110 may be configured to implement one or more address generation engines, which may be based, for example, on one or more configurable patterns (address patterns) 1142, for example, including a multi-dimensional pattern, e.g., a five-dimensional pattern and/or any other address pattern, e.g., as described below.

In some demonstrative aspects, system 1101 may include a controller 1140, for example, a micro-controller (uCTRL) 1140, which may be configured to pre-configure the address patterns 1142, e.g., as described below.

In some demonstrative aspects, controller 1140 may be configured to configure the configurable patterns 1142, for example, based on the predefined transformation from the first data array to the second data array, e.g., as described below.

In some demonstrative aspects, controller 1140 may be configured to configure the configurable patterns 1142, for example, to allow DMT 1110 to 'jump' between memory addresses, for example, according to a desired dimension, e.g., as described below.

In some demonstrative aspects, controller 1140 may be configured to configure the configurable patterns 1142, for example, to allow DMT 1110 to interleave between multiple input and/or output buffers, e.g., as described below.

In some demonstrative aspects, controller 1140 may be configured to configure the configurable patterns 1142, for example, to allow DMT 1110 rotate between DDR banks, and/or to perform one or more additional or alternative operations and/or functionalities corresponding to the desired dimension, e.g., as described below.

In some demonstrative aspects, DMT 1110 may include a DMT controller 1118, which may be configured to control one or more operations and/or functionalities of DMT 1110, e.g., as described below.

In some demonstrative aspects, the controller 1140 may be configured to send one or more DMT commands 1141, e.g., to DMT controller 1118, e.g., as described below.

In some demonstrative aspects, the DMT controller 1118 may be configured to control passage of data between the memory-mapped source memory 1132 and the memory-mapped destination memory 1134, for example, based on a DMT command 1141 from micro-controller 1140, e.g., for each DMT command, e.g., as described below.

In some demonstrative aspects, DMT 1110 may include address generation logic, which may be configured to use the pre-configured address patterns 1142, for example, together with a start address, e.g., which may be provided in the DMT command 1141.

In some demonstrative aspects, DMT 1110 may be configured to implement at least one source address generation engine 1122, which may be, for example, based on a configurable read pattern, for example, a multi-dimensional read pattern, e.g., a five-dimensional read pattern and/or any other read pattern, e.g., as described below.

In some demonstrative aspects, DMT 1110 may be configured to implement at least one destination address generation engine 1124, which may be based, for example, on a configurable write pattern, for example, a multi-dimensional write pattern, e.g., a five-dimensional write pattern and/or any other write pattern, e.g., as described below.

In some demonstrative aspects, memory reader 1123 may be configured to read data from memory-mapped source memory 1132, for example, based on read addresses, which may be provided by source address generation engine 1122, for example, based on the configurable read pattern and a read start address, for example, which may be provided in the DMT command 1141, e.g., as described below.

In some demonstrative aspects, memory writer 1125 may be configured to write data to memory-mapped destination memory 1134, for example, based on write addresses, which may be provided by destination address generation engine 1124, for example, based on the configurable write pattern and a write start address, for example, which may be provided in the DMT command 1141, e.g., as described below.

In some demonstrative aspects, an address pattern 1142, e.g., each address pattern 1142, may include patterns for a plurality of sub-addresses, e.g., as described below.

In one example, an address pattern 1142, e.g., each address pattern 1142, may include patterns for up to five sub-addresses. In other aspects, the address pattern 1142 may include patterns for any other number of sub-addresses.

In some demonstrative aspects, there may be one or more parameters defined for a sub-address, e.g., each sub address, of the plurality of sub-addresses, e.g., as described below.

In one example, a parameter set may be defined for a sub-address, e.g., for each sub-address of the plurality of sub-addresses. For example, a parameter set for a sub-address may be defined to include a plurality of parameters, e.g., as described below.

In some demonstrative aspects, a parameter set for a sub-address may be defined to include a period parameter, which may be based, for example, on a number of memory transactions, e.g., read or write memory transactions, after which a value of a corresponding sub-address should be updated, e.g., as described below.

In some demonstrative aspects, a parameter set for a sub-address may be defined to include a step parameter, which may indicate, for example, by how much to increment a sub-address, for example, once the sub-address should be updated, e.g., as described below.

In some demonstrative aspects, a parameter set for a sub-address may be defined to include a wrap parameter, e.g., a wrap period parameter, which may be based, for example, on a count of memory transactions, e.g., the read or write memory transactions, after which a sub-address should wrap back to a wrap address, e.g., a zero address or any other wrap address, e.g., as described below.

In some demonstrative aspects, a parameter set for a sub-address may be defined to include some or all of the period parameter, the step parameter, and/or the wrap parameter.

In other aspects, a parameter set for a sub-address may be defined to include one or more additional or alternative parameters.

In some demonstrative aspects, an address generation logic, e.g., source address generation logic 1122 and/or destination address generation logic 1124, may be configured to perform one or more operations on the sub-addresses of the address pattern 1142, for example, in a processing cycle, e.g., in each cycle.

In some demonstrative aspects, the address generation logic, e.g., source address generation logic 1122 and/or destination address generation logic 1124, may be configured to update a sub-address, e.g., each sub-address, according to its address pattern, e.g., in each cycle, e.g., as described below.

In some demonstrative aspects, the address generation logic, e.g., source address generation logic 1122 and/or destination address generation logic 1124, may be configured to sum all the sub-addresses, for example, to determine a memory address to be accessed.

For example, source address generation logic 1122 may be configured to determine a memory address to be read by memory reader 1123, and/or destination address generation logic 1124 may be configured to determine a memory address to be written by memory writer 1125, e.g., as described below.

In some demonstrative aspects, source address generation logic 1122 may be configured to provide a technical solution to support efficient read operations, for example, from scattered, non-incremental addresses of source memory 1132.

In some demonstrative aspects, destination address generation logic 1124 may be configured to provide a technical solution to support efficient write operations, for example, to scattered, non-incremental addresses of destination memory 1134.

In some demonstrative aspects, the address generation logic, e.g., source address generation logic 1122 and/or destination address generation logic 1124, may be configured to provide a technical solution to eliminate a need to build and/or maintain long address lists.

In some demonstrative aspects, the address generation logic, e.g., source address generation logic 1122 and/or destination address generation logic 1124, may be configured to provide a technical solution to support a flexibility, for example, to re-arrange a database, e.g., as needed.

In some demonstrative aspects, it may be enough to use the designed address generation logic, e.g., source address generation logic 1122 and/or destination address generation logic 1124, for example, for efficient matrix transpose, for example, in case that each bus and/or memory entry contains a single element, for example, as memory entries and/or elements may be arranged in any desired order.

In some demonstrative aspects, for example, in case of high-BW implementations, data busses and/or memory entries may be wide. Accordingly, a data bus and/or a memory entry, e.g., each of the data busses and/or memory entries, may include a plurality of data elements.

For example, wide data busses and/or memory entries may be implemented, for example, to provide a technical solution to support smaller DMA latencies and/or vectorized operations on multiple elements, e.g., simultaneously.

In some demonstrative aspects, DMT 1110 may be configured to implement an internal Row-to-Column (R2C) transformer 1120, which may be configured to transform a data sub-array, for example, retrieved by memory reader 1123 from source memory 1132, into a transformed data sub-array, for example, to be written by memory writer 1125 to destination memory 1134, e.g., as described below.

In some demonstrative aspects, R2C transformer 1120 may be configured to transform the data sub-array into the transformed data sub-array, for example, by transforming one or more rows of the data sub-array into one or more respective columns of the transformed data sub-array, e.g., as described below.

In some demonstrative aspects, R2C transformer 1120 may be configured to have, for example, a configurable database element size, e.g., as described below.

In some demonstrative aspects, memory reader 1123 may be configured to populate the data sub-array of R2C transformer 1120, for example, with data retrieved from the source memory 1132 according to the memory read pattern, e.g., as described above.

In some demonstrative aspects, memory writer 1125 may be configured to write data from the transformed data sub-array of R2C transformer 1120, for example, to the destination memory 1134 according to the memory write pattern, e.g., as described above.

In some demonstrative aspects, R2C transformer 1120 may be configured to re-arrange the plurality of data elements within a memory entry, e.g., across other entries, e.g., as described below.

In some demonstrative aspects, R2C module 1120 may be configured to transform the data sub-array into the transformed data sub-array, for example, to rearrange a plurality of data elements within a memory entry.

For example, a size of the data sub-array implemented by R2C transformer 1120 may be based, for example, on a count of the plurality of data elements within the memory entry, e.g., of source memory 1132.

In some demonstrative aspects, a size of the data sub-array implemented by R2C transformer 1120, e.g., an R2C matrix size, may be based on, e.g., may be equal to, (number of elements in cycle)$^2$, wherein number of elements in cycle denotes a number of memory elements processed per cycle of the DMT 1110.

In some demonstrative aspects, the size of the data sub-array implemented by R2C transformer 1120 may be determined, for example, regardless of a size of a full matrix on which dimension conversion should be done. In other aspects, any other suitable R2C matrix size may be used.

In some demonstrative aspects, R2C transformer 1120 may be configured to implement a plurality of data sub-arrays, e.g., two or more R2C matrixes, for example, to provide a technical solution to support ‘double-buffer’ like operation for back-to-back flow, for example, to support improved, e.g., maximal, efficiency and/or BW.

In some demonstrative aspects, R2C transformer 1120 may be configured to provide a technical solution to support a transpose of relatively large matrixes, e.g., as described below.

In some demonstrative aspects, DMT 1110 may be configured, for example, to perform a multi-dimensional array transpose of a relatively large array, for example, by dividing the large array into a plurality of smaller data sub-arrays, e.g., a plurality of smaller R2C matrixes, e.g., as described below.

In some demonstrative aspects, DMT 1110 may be configured, for example, to utilize R2C transformer 1120 to perform the multi-dimensional array transpose of the relatively large array, for example, by transforming the plurality of smaller data sub-arrays into a plurality of respective transformed data sub-arrays.

In some demonstrative aspects, the size of a data sub-array may be based on, e.g., may be equal to, the R2C matrix size, for example, equal to (number of elements in memory entry)$^2$. In other aspects, any other suitable sub-array size may be used.

In some demonstrative aspects, DMT controller 1118 may be configured to configure memory reader 1123 to read a 2D sub-array, e.g., each 2D sub-array, for example, separately, from source memory 1132, for example, using a tailored source address pattern provided by address generator 1122 based on the address pattern 1142, e.g., which may be configured by controller 1140.

In some demonstrative aspects, R2C transformer may be configured to perform the R2C operation on the sub-array, e.g., as described below.

In some demonstrative aspects, DMT controller 1118 may be configured to configure memory writer 1125 to write data from the resulting transformed sub-array to the destination memory 1134, for example, using a tailored destination address pattern provided by address generator 1124 based on the address pattern 1142, e.g., which may be configured by controller 1140.

In some demonstrative aspects, this process may be repeated for one or more times, for example, until all sub-arrays from which the large array is composed may be transformed and written to the destination memory 1134, e.g., DMA-ed and processed.

In some demonstrative aspects, DMT 1110 may be configured to transform the first data array from source memory 1132 into the second data array to be written into destination memory 1134, for example, by performing a sequence of read/write cycles, e.g., as described below.

In some demonstrative aspects, DMT 1110 may be configured to perform a read/write cycle of the sequence of read/write cycles, for example, by controlling memory reader 1123 to populate one or more rows of the data sub-array of R2C transformer 1120, for example, by one or more respective memory entries retrieved by the memory reader 1123 from the source memory 1132, for example, according to the memory read pattern, e.g., as described above.

In some demonstrative aspects, DMT 1110 may be configured to perform the read/write cycle of the sequence of read/write cycles, for example, by controlling R2C transformer 1120, for example, to transform the one or more rows of the data sub-array into one or more respective columns of the transformed data sub-array of R2C transformer 1120, e.g., as described above.

In some demonstrative aspects, DMT 1110 may be configured to perform the read/write cycle of the sequence of read/write cycles, for example, by controlling memory writer 1125 to write data from one or more rows of the transformed data sub-array to one or more respective memory entries of the destination memory 1134, for example, according to the memory write pattern, e.g., as described above.

Figure 12:
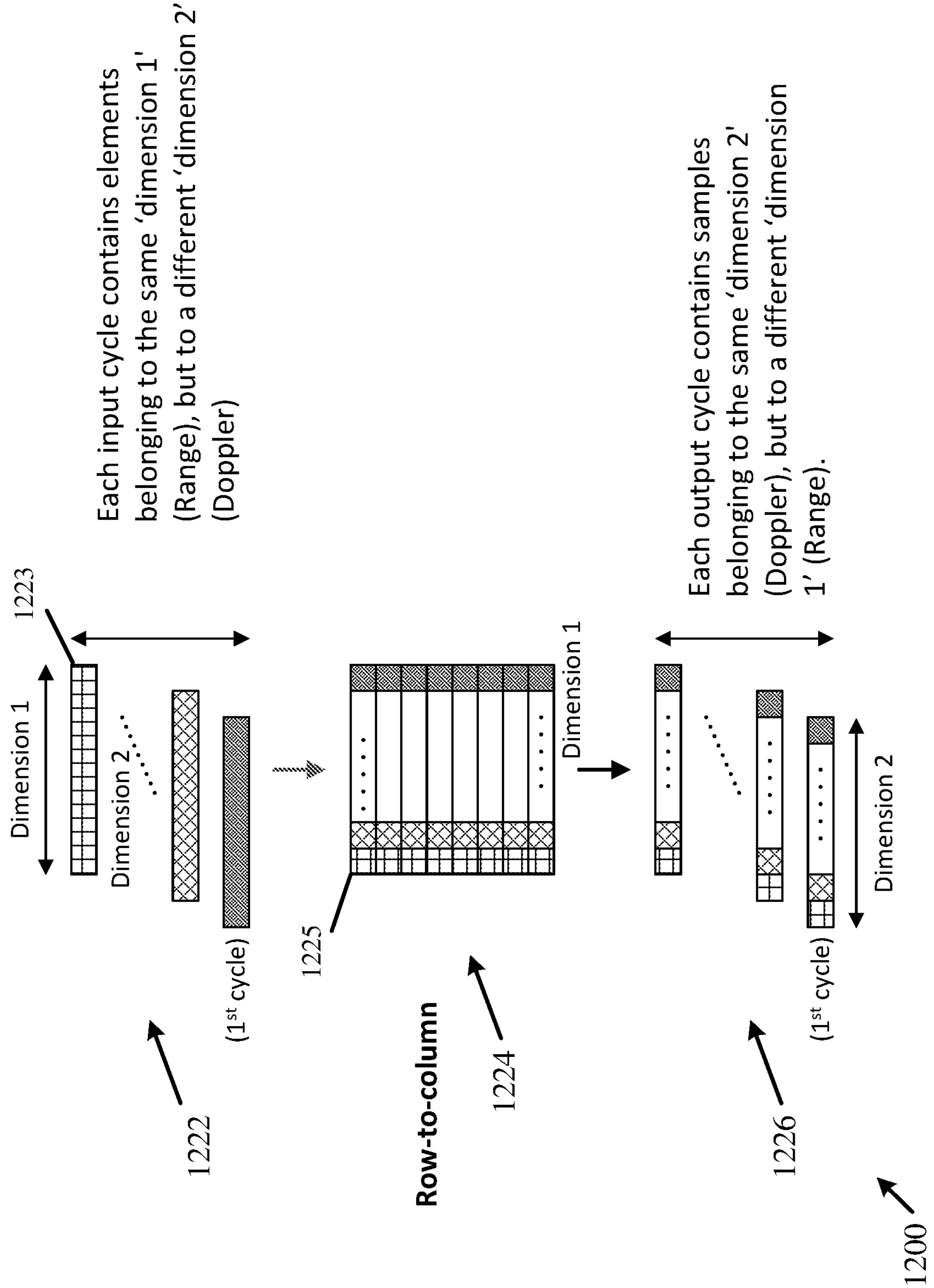
FIG. 12 is a schematic illustration of a data flow of a Row to Column (R2C) transformation, in accordance with some demonstrative aspects.

Reference is made to FIG. 12, which schematically illustrates data flow of an R2C transformation 1200, in accordance with some demonstrative aspects.

For example, R2C transformer 1020 (FIG. 10) may perform one or more operations and/or functionalities of R2C transformation 1200.

In some demonstrative aspects, R2C transformer 1020 (FIG. 10) may perform one or more operations and/or functionalities of the R2C transformation 1200, for example, to transform the data sub-array 1022 (FIG. 10) into the transformed data sub-array 1024 (FIG. 10).

In some demonstrative aspects, as shown in FIG. 12, R2C transformation 1200 may be implemented to transform entries of a first data array 1222 retrieved from a first memory, e.g., source memory 1132 (FIG. 11), into entries of a second data array 1226 to be stored in a second memory, e.g., destination memory 1134 (FIG. 11).

In some demonstrative aspects, as shown in FIG. 12, the first data array 1222 may include elements arranged according to a first processing dimension, and the second data array 1226 may include elements arranged according to a second processing dimension, e.g., as described below.

In some demonstrative aspects, the first data array 1222 may include elements arranged according to a first radar-processing dimension, and the second data array 1226 may include elements arranged according to a second radar-processing dimension, e.g., as described below.

In some demonstrative aspects, the first radar-processing dimension may include, for example, a range processing dimension, and/or the second radar-processing dimension may include, for example, a doppler processing dimension.

In other aspects, the first data array 1222 may include elements arranged according to any other first processing dimension, and/or the second data array 1226 may include elements arranged according to any other second processing dimension.

In some demonstrative aspects, as shown in FIG. 12, during an input cycle, data entries of the first data array 1222 may be populated in one or more rows 1223 of a data sub-array, for example, according to a memory read pattern, e.g., as described above.

In some demonstrative aspects, as shown in FIG. 12, R2C transformation 1200 may be configured to transform the data sub-array into a transformed data sub-array 1224.

In some demonstrative aspects, as shown in FIG. 12, R2C transformation 1200 may include transforming the data sub-array into the transformed data sub-array 1224, for example, by transforming one or more rows 1223 of the data sub-array into one or more respective columns 1225 of the transformed data sub-array 1224.

In some demonstrative aspects, as shown in FIG. 12, during an output cycle, data from one or more rows 1225 of the transformed data sub-array 1224 may be written to the second data array 1226, for example, in one or more respective memory entries of the second memory, for example, according to the memory write pattern, e.g., as described above.

Figure 13A:
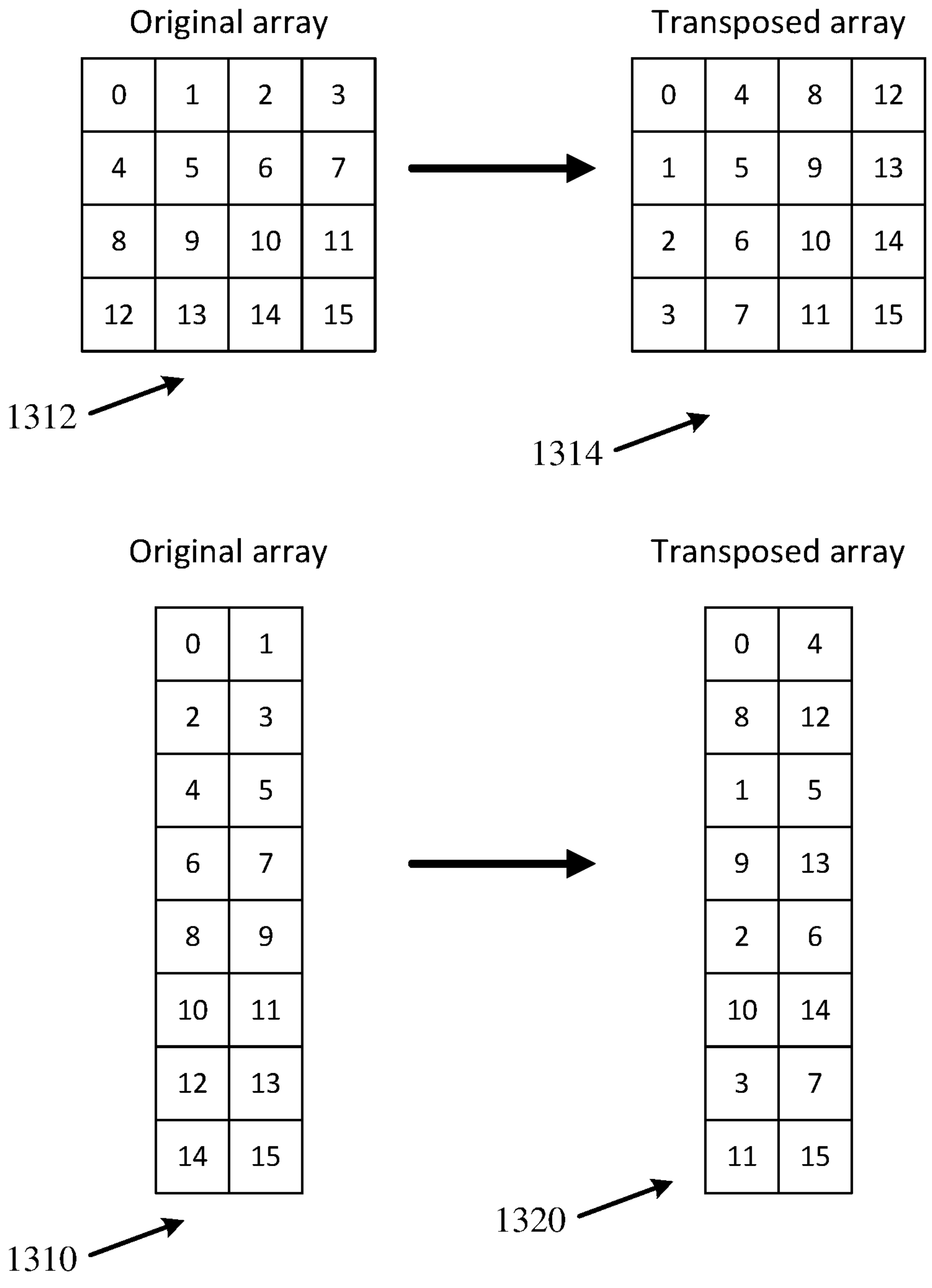
FIG. 13A and FIG. 13B are schematic illustrations of a transformation scheme to transform a first data array into a second data array, in accordance with some demonstrative aspects.
Figure 13B:
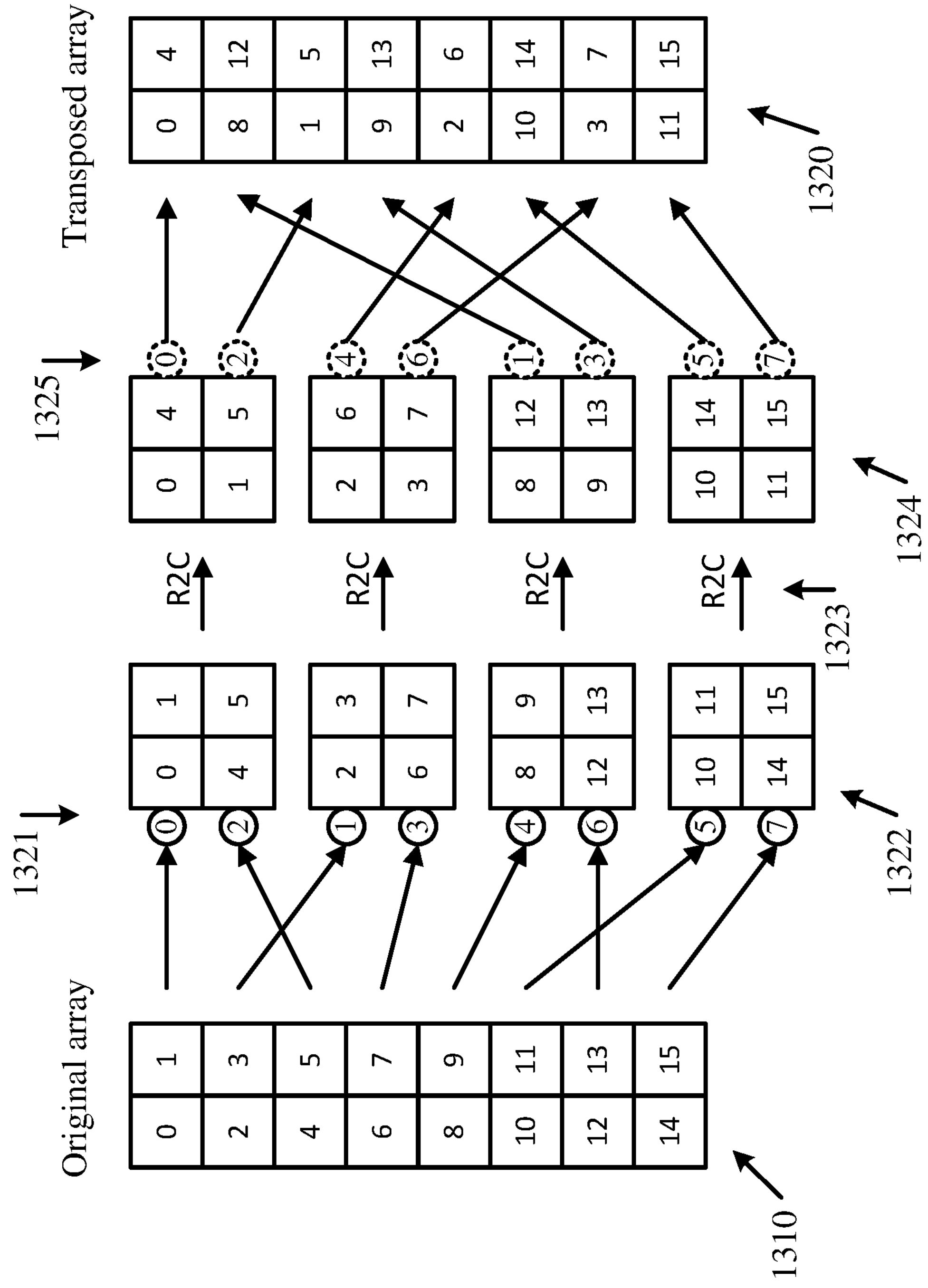

Reference is made to FIG. 13A and FIG. 13B, which schematically illustrate a transformation scheme to transform a first data array ("original array") 1310 into a second data array ("transposed array") 1320, in accordance with some demonstrative aspects.

For example, in some demonstrative aspects, DMT 1110 (FIG. 11) may be configured to utilize the transformation scheme of FIGS. 13A and 13B to transform a first data array with two elements per memory entry, e.g., retrieved from source memory 1132 (FIG. 11), into a second data array with two elements per memory entry, e.g., to be stored in destination memory 1134 (FIG. 11), e.g., as described below.

In some demonstrative aspects, as shown in FIG. 13A, first data array 1310 may have a 2×8 arrangement including eight memory entries with two elements per memory entry, and second data array 1320 may have a 2×8 arrangement including eight memory entries with two elements per memory entry.

In some demonstrative aspects, as shown in FIG. 13A, first data array 1310 may represent an arrangement of an original array 1312 having a size of 4×4, for example, according to an arrangement having two elements per memory-entry.

In some demonstrative aspects, second data array 1310 may represent an arrangement of a transposed array 1314 having a size of 4×4, for example, according to an arrangement having two elements per memory-entry.

In some demonstrative aspects, as shown in FIG. 13A, the transposed array 1314 may include a transpose of the original array 1310.

For example, as shown in FIG. 13A, rows of the transposed array 1314 may include columns of the original array 1312, and vice versa.

For example, the first data array 1312 may be arranged in memory, e.g., source memory 1132 (FIG. 11), before the transpose, and second data array 1314 may be arranged in memory, e.g., destination memory 1134 (FIG. 11), after the transpose.

In some demonstrative aspects, a DMT, e.g., DMT 1010 (FIG. 10) and/or DMT 1110 (FIG. 11), may be configured to perform one or more operations, for example, to transform the first data array 1312 into the second data array 1314.

In some demonstrative aspects, as shown in FIG. 13B, the DMT, e.g., DMT 1010 (FIG. 10) and/or DMT 1110 (FIG. 11), may be configured to populate one or more data sub-arrays 1322, by memory entries from the first data array 1310, for example, according to a memory read pattern 1321.

In some demonstrative aspects, a count of possible read write cycles, may be based, for example, on a count of the one or more data sub-arrays 1322.

In one example, a count of four data sub-arrays 1322 may support four read write cycles. According to this example, a sequence of four read-write cycles, e.g., back-to-back cycles, may be used.

In some demonstrative aspects, as shown in FIG. 13B, the memory read pattern 1321 may include a sequence of read entry addresses: 0, 2, 1, 3, 4, 6, 5, 7.

For example, the source address generation module 1122 (FIG. 11) may generate the memory read pattern 1321.

In some demonstrative aspects, the source address generation module 1122 (FIG. 11) may generate the memory read pattern 1321, for example, based on a plurality of read sub-address sequences, e.g., including three read sub-addresses.

For example, the three read sub-addresses may include a first sub-address (#0), a second sub-address (#1), and a third sub-address (#2).

In other aspects, any other count of read sub-addresses may be implemented.

In some demonstrative aspects, a read sub-address, e.g., each read sub-address, of the three read sub-addresses, may include a sub-address parameter set, for example, including a period parameter, a step parameter, and a wrap parameter, e.g., as follows:

Sub-address #0: Period=4, step=4, wrap=0xFF (no wrap)
Sub-address #1: Period=2, step=1, wrap=4
Sub-address #2: Period=1, step=2, wrap=2

In some demonstrative aspects, the DMT, e.g., DMT 1010 (FIG. 10) and/or DMT 1110 (FIG. 11), may be configured to determine a read sub-address value for a read sub-address, for example, for each read sub-address of the three read sub-addresses, for example, based on a parameter set of the read sub-address.

For example, the source address generation module 1122 (FIG. 11) may generate the memory read pattern including the sequence 1321, which may be configured, for example, to include the following sequence of addresses: 0, 2, 1, 3, 4, 6, 5, 7, for example, by summation of the three read sub-addresses, e.g., as follows:

TABLE 1

| | Sub-address 0 | Sub-address 1 | Sub-address 2 | Address = sum of Sub-address 0, Sub-address 1, and Sub-address 2 |
|---|---|---|---|---|
| 0 | 0 | 0 | 0 | 0 |
| 1 | 0 | 0 | 2 | 2 |
| 2 | 0 | 1 | 0 | 1 |
| 3 | 0 | 1 | 2 | 3 |
| 4 | 4 | 0 | 0 | 4 |
| 5 | 4 | 0 | 2 | 6 |
| 6 | 4 | 1 | 0 | 5 |
| 7 | 4 | 1 | 2 | 7 |

For example, as shown in Table 1, the source address generation module 1122 (FIG. 11) may generate the read address 5 (line 6), for example, by summation of a sub-address value of 4 resulting from the value of the first sub-address #0 corresponding to a seventh read cycle, a sub-address value of 1 resulting from the value of the second sub-address #1 corresponding to the seventh read cycle, and a sub-address value of 0 resulting from the value of the third sub-address #2 corresponding to the seventh read cycle.

In some demonstrative aspects, one or more R2C operations 1323 may be performed by an R2C transformer, e.g., R2C transformer 1020 (FIG. 10), and/or R2C transformer 1120 (FIG. 11), may be configured to transform the one or more data sub-arrays 1322 into one or more transformed data sub-arrays 1324.

In some demonstrative aspects, as shown in FIG. 13B, the R2C operations 1323 may be configured to transform a data sub-array 1322 into a transformed data sub-array 1324, for example, by transforming two rows of the data sub-array 1322 into two respective columns of the transformed data sub-array 1324.

In some demonstrative aspects, the DMT, e.g., DMT 1010 (FIG. 10) and/or DMT 1110 (FIG. 11), may be configured to write data from the one or more transformed data sub-arrays 1324 to the second data array 1320, for example, according to a memory write pattern 1325.

In some demonstrative aspects, as shown in FIG. 13B, the memory write pattern 1325 may include a sequence of write entry addresses: 0, 2, 4, 6, 1, 3, 5, 7.

For example, the destination address generation module 1124 (FIG. 11) may generate the memory write pattern 1325.

In some demonstrative aspects, the destination address generation module 1124 (FIG. 11) may generate the memory write pattern 1325, for example, based on a plurality of write sub-address sequences, e.g., including two write sub-addresses.

In some demonstrative aspects, a write sub-address, e.g., each write sub-address of the two write sub-addresses may include a sub-address parameter set, which may be defined, for example, according to the memory write pattern.

For example, the destination address generation module 1125 (FIG. 11) may generate the memory write pattern 1325 including the sequence 0, 2, 4, 6, 1, 3, 5, 7, of write addresses, for example, based on summation of the two write sub-addresses.

In other aspects, any other count of write sub-addresses may be implemented.

In some demonstrative aspects, the transformation scheme described herein may be extended to much larger arrays, e.g., larger than arrays 1312 and 1314 (FIG. 13A). For example, the transformation scheme described herein may be extended to support original arrays having a size larger than 4×4, for example, 128×128, or 128×200, or even larger arrays.

In some demonstrative aspects, the transformation scheme described herein may be extended to support data arrays having a larger number elements per memory entry, e.g., larger than the two elements per memory entry of arrays 1310 and 1320 (FIG. 13A). For example, the transformation scheme described herein may be extended to support more than two elements per memory entry, e.g., three memory elements per memory entry, or even four or more memory elements per memory entry.

In some demonstrative aspects, a size of data subarrays 1322 and/or transformed data sub-arrays 1324 may be extended, for example, based on a count of elements per memory entry.

For example, data subarrays 1322 and/or transformed data sub-arrays 1324 may configured to have a size of 3×3, for example, to support three memory elements per memory entry.

In some demonstrative aspects, the transformation scheme described herein may be applied to a multi-dimensional array, e.g., having more than two dimensions, e.g., three dimensions or more.

Figure 14:
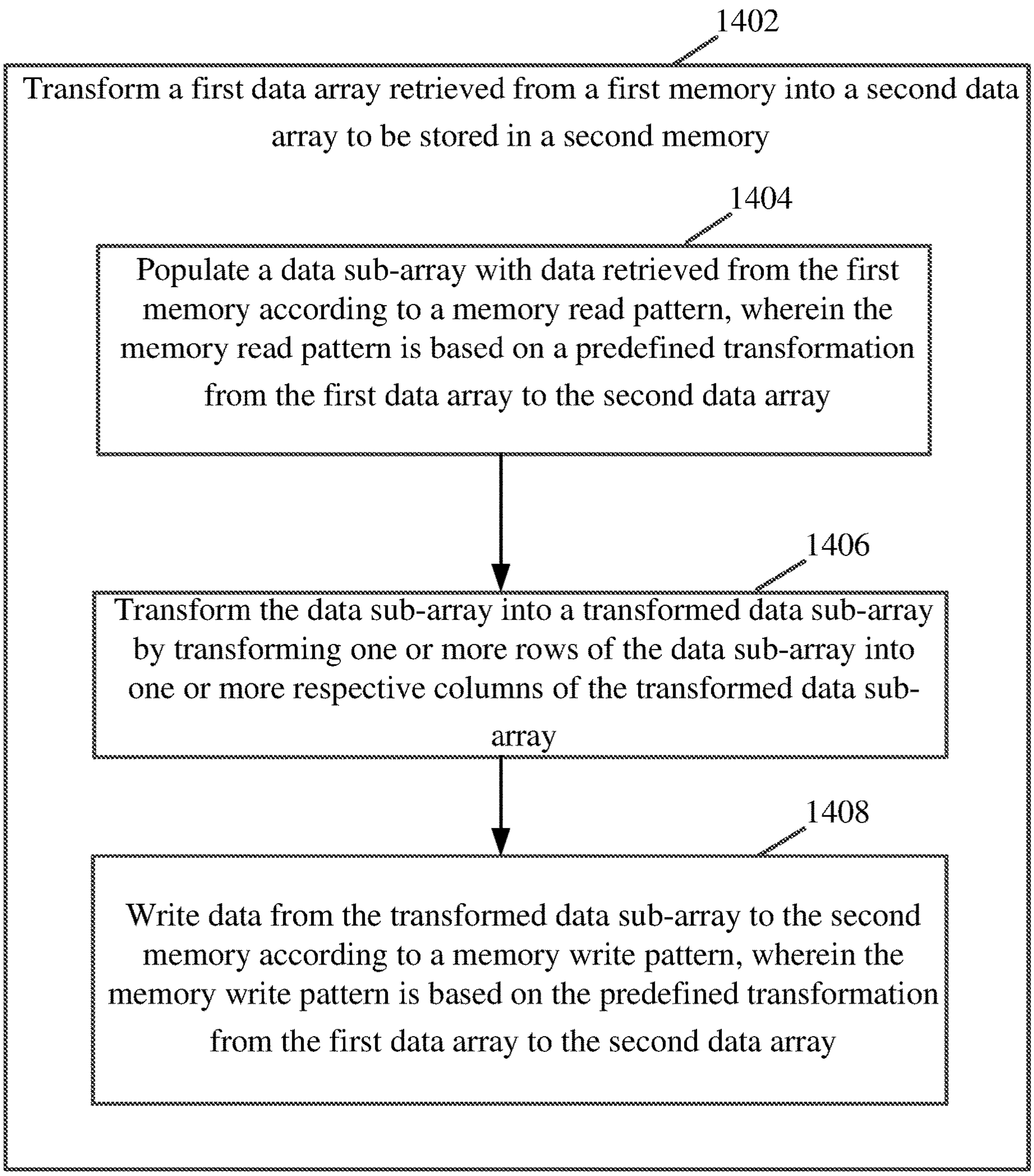
FIG. 14 is a schematic flow-chart illustration of a method of data array transformation, in accordance with some demonstrative aspects.

Reference is made to FIG. 14, which schematically illustrates a method of data array transformation. For example, one or more of the operations of the method of FIG. 14 may be performed by a radar system, e.g., radar system 900 (FIG. 9); a radar device, e.g., radar device 101 (FIG. 1), radar device 800 (FIG. 8), and/or radar device 910 (FIG. 9); a processor, e.g., radar processor 834 (FIG. 8), and/or baseband processor 930 (FIG. 9); and/or a DMT, e.g., DMT 1010 (FIG. 10), and/or DMT 1110 (FIG. 11).

As indicated at block 1402, the method may include transforming a first data array retrieved from a first memory into a second data array to be stored in a second memory. For example, DMT 1010 (FIG. 10) may transform the first data array 1031 (FIG. 10) retrieved from the first memory 1032 (FIG. 10) into the second data array 1035 (FIG. 10) to be stored in the second memory 1034 (FIG. 10), e.g., as described above.

As indicated at block 1404, transforming the first data array into the second data array may include populating a data sub-array with data retrieved from the first memory according to a memory read pattern. For example, the memory read pattern may be based on a predefined transformation from the first data array to the second data array. For example, DMT 1010 (FIG. 10), e.g., using memory reader 1012 (FIG. 10), may populate the data sub-array 1022 (FIG. 10) with the data retrieved from the first memory 1032 (FIG. 10), for example, according to the memory read pattern, e.g., as described above.

As indicated at block 1406, transforming the first data array into the second data array may include transforming the data sub-array into a transformed data sub-array, for example, by transforming one or more rows of the data sub-array into one or more respective columns of the transformed data sub-array. For example, DMT 1010 (FIG. 10), e.g., using R2C transformer 1020 (FIG. 1), may transform the data sub-array 1022 (FIG. 10) into the transformed data sub-array 1024 (FIG. 10), for example, by transforming the one or more rows of the data sub-array 1022 (FIG. 10) into the one or more respective columns of the transformed data sub-array 1024 (FIG. 10), e.g., as described above.

As indicated at block 1408, transforming the first data array into the second data array may include writing data from the transformed data sub-array to the second memory according to a memory write pattern. For example, the memory write pattern may be based on the predefined transformation from the first data array to the second data array. For example, DMT 1010 (FIG. 10), e.g., using memory writer 1014 (FIG. 10), may write the data from the transformed data sub-array 1024 (FIG. 10) to the second memory 1034 (FIG. 10), for example, according to the memory write pattern, e.g., as described above.

Figure 15:
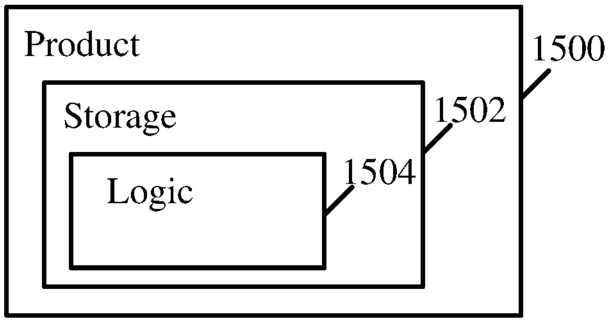
FIG. 15 is a schematic illustration of a product of manufacture, in accordance with some demonstrative aspects.

Reference is made to FIG. 15, which schematically illustrates a product of manufacture 1500, in accordance with some demonstrative aspects. Product 1500 may include one or more tangible computer-readable ("machine-readable") non-transitory storage media 1502, which may include computer-executable instructions, e.g., implemented by logic 1504, operable to, when executed by at least one computer processor, enable the at least one computer processor to implement one or more operations and/or functionalities described with reference to any of the FIGS. 1-14, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1500 and/or machine-readable storage media 1502 may include one or more types of computer-readable storage media capable of storing data, including volatile memory, non-volatile memory, removable or non-removable memory, erasable or non-erasable memory, writeable or re-writeable memory, and the like. For example, machine-readable storage media 1502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a Data Mover and Transformer (DMT) configured to transform a first data array retrieved from a first memory into a second data array to be stored in a second memory, the DMT comprising a Row to Column (R2C) transformer configured to transform a data sub-array into a transformed data sub-array by transforming one or more rows of the data sub-array into one or more respective columns of the transformed data sub-array; a memory reader to populate the data sub-array with data retrieved from the first memory according to a memory read pattern, wherein the memory read pattern is based on a predefined transformation from the first data array to the second data array; and a memory writer to write data from the transformed data sub-array to the second memory according to a memory write pattern, wherein the memory write pattern is based on the predefined transformation from the first data array to the second data array.

Example 2 includes the subject matter of Example 1, and optionally, wherein the DMT comprises an address pattern input to input read pattern information and write pattern information, wherein the memory reader is configured to determine the memory read pattern based on the read pattern information, wherein the memory writer is configured to determine the memory write pattern based on the write pattern information.

Example 3 includes the subject matter of Example 2, and optionally, wherein the read pattern information comprises read sub-address information to define a plurality of read sub-address sequences, the memory read pattern is based on a combination of the plurality of read sub-address sequences, wherein the write pattern information comprises write sub-address information to define a plurality of write sub-address sequences, the memory write pattern is based on a combination of the plurality of write sub-address sequences.

Example 4 includes the subject matter of Example 3, and optionally, wherein the memory read pattern is based on a summation of the plurality of read sub-address sequences, wherein the memory write pattern is based on a summation of the plurality of write sub-address sequences.

Example 5 includes the subject matter of Example 3 or 4, and optionally, wherein at least one of the read sub-address information or the write sub-address information comprises at least one sub-address parameter set to define at least one sub-address sequence, respectively, the sub-address parameter set comprising at least one of a period parameter, a step parameter, or a wrap parameter, wherein the period parameter is to define a first count of memory transactions after which a value of the sub-address sequence is to be updated, the step parameter is to define a step to increment the value of the sub-address sequence at an update, the wrap parameter is to define a wrap operation to return the sub-address sequence to a wrap address.

Example 6 includes the subject matter of Example 5, and optionally, wherein the wrap parameter comprises a wrap period or a wrap value, wherein the wrap period is to define a second count of memory transactions after which the sub-address sequence is to be returned to the wrap address, wherein the wrap value is to define a predefined memory address at which the sub-address sequence is to be returned to the wrap address.

Example 7 includes the subject matter of Example 5 or 6, and optionally, wherein the wrap address comprises an initial address of the sub-address sequence, or a predefined wrap address different from the initial address of the sub-address sequence.

Example 8 includes the subject matter of any one of Examples 1-7, and optionally, wherein the DMT is configured to transform the first data array into the second data array by performing a sequence of read/write cycles, a read/write cycle of the sequence of read/write cycles comprising populating the one or more rows of the data sub-array by one or more respective memory entries retrieved by the memory reader from the first memory according to the memory read pattern; transforming the one or more rows of the data sub-array into the one or more respective columns of the transformed data sub-array; and writing data from one or more rows of the transformed data sub-array to one or more respective memory entries of the second memory according to the memory write pattern.

Example 9 includes the subject matter of any one of Examples 1-8, and optionally, wherein the DMT is configured to configure at least one of a count of the rows in the data sub-array or a count of the columns in the data sub-array based on input R2C configuration information.

Example 10 includes the subject matter of any one of Examples 1-9, and optionally, wherein a count of the rows in the data sub-array and a count of the columns in the data sub-array are based on an element size of a data element in the first data array.

Example 11 includes the subject matter of any one of Examples 1-10, and optionally, wherein a count of the rows in the data sub-array is based on a memory entry size of the first memory.

Example 12 includes the subject matter of any one of Examples 1-11, and optionally, wherein a count of the rows in the data sub-array is based on a count of data elements of the first data array per memory entry of the first memory.

Example 13 includes the subject matter of any one of Examples 1-12, and optionally, wherein a count of the columns in the data sub-array is based on a memory entry size of the second memory.

Example 14 includes the subject matter of any one of Examples 1-13, and optionally, wherein a count of the columns in the data sub-array is based on a count of data elements of the second data array per memory entry of the second memory.

Example 15 includes the subject matter of any one of Examples 1-14, and optionally, wherein each of the first data array and the second data array comprises two or more dimensions.

Example 16 includes the subject matter of any one of Examples 1-15, and optionally, comprising a processor configured to generate radar information based on the second data array in the second memory.

Example 17 includes the subject matter of Example 16, and optionally, wherein the first data array in the first memory comprises first processed radar data arranged in the first data array according to a first radar-processing dimension, wherein the second data array is arranged according to a second radar-processing dimension to be processed by the processor.

Example 18 includes the subject matter of Example 17, and optionally, wherein the processor is configured to generate second processed radar data by processing data from the second data array according to the second radar-processing dimension, to store the second processed radar data in a third data array in the first memory, and to configure the DMT to transform the third data array from the first memory into a fourth data array to be stored in the second memory, the fourth data array is arranged according to a third radar-processing dimension to be processed by the processor.

Example 19 includes the subject matter of Example 18, and optionally, wherein the second radar-processing dimension is different from the first radar-processing dimension, and the third radar-processing dimension is different from the second radar-processing dimension.

Example 20 includes the subject matter of any one of Examples 16-19, and optionally, comprising a vehicle, the vehicle comprising a system controller to control one or more systems of the vehicle based on the radar information.

Example 21 includes a computing device comprising the subject matter of any of Examples 1-20.

Example 22 includes a radar system comprising the subject matter of any of Examples 1-20.

Example 23 includes a vehicle comprising the subject matter of any of Examples 1-20.

Example 24 includes an apparatus comprising means for performing any of the described operations of any of Examples 1-20.

Example 25 includes a machine-readable medium that stores instructions for execution by a processor to perform any of the described operations of any of Examples 1-20.

Example 26 comprises a product comprising one or more tangible computer-readable non-transitory storage media comprising instructions operable to, when executed by at least one processor, enable the at least one processor to cause a device and/or system to perform any of the described operations of any of Examples 1-20.

Example 27 includes an apparatus comprising a memory; and processing circuitry configured to perform any of the described operations of any of Examples 1-20.

Example 28 includes a method including any of the described operations of any of Examples 1-20.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

a Data Mover and Transformer (DMT) configured to transform a first data array retrieved from a first memory into a second data array to be stored in a second memory, the DMT comprising:

an address-pattern input to input read-pattern information and write-pattern information;

a Row to Column (R2C) transformer configured to transform a data sub-array into a transformed data sub-array by transforming one or more rows of the data sub-array into one or more respective columns of the transformed data sub-array;

a memory reader to populate the data sub-array with data retrieved from the first memory according to a memory read pattern, the memory read pattern is based on the read-pattern information, wherein the memory read pattern is based on a predefined transformation from the first data array to the second data array; and a memory writer to write data from the transformed data sub-array to the second memory according to a memory write pattern, the memory write pattern is based on the write-pattern information, wherein the memory write pattern is based on the predefined transformation from the first data array to the second data array.

2. The apparatus of claim 1, wherein the read-pattern information comprises read sub-address information to define a plurality of read sub-address sequences, wherein the write-pattern information comprises write sub-address information to define a plurality of write sub-address sequences.

3. The apparatus of claim 1, wherein the read-pattern information comprises read sub-address information to define a plurality of read sub-address sequences, the memory read pattern is based on a combination of the plurality of read sub-address sequences, wherein the write-pattern information comprises write sub-address information to define a plurality of write sub-address sequences, the memory write pattern is based on a combination of the plurality of write sub-address sequences.

4. The apparatus of claim 3, wherein the memory read pattern is based on a summation of the plurality of read sub-address sequences, wherein the memory write pattern is based on a summation of the plurality of write sub-address sequences.

5. The apparatus of claim 3, wherein at least one of the read sub-address information or the write sub-address information comprises at least one sub-address parameter set to define at least one sub-address sequence, respectively, the sub-address parameter set comprising at least one of a period parameter, a step parameter, or a wrap parameter, wherein the period parameter is to define a count of memory transactions after which a value of the sub-address sequence is to be updated, the step parameter is to define a step to increment the value of the sub-address sequence at an update, the wrap parameter is to define a wrap operation to return the sub-address sequence to a wrap address.

6. The apparatus of claim 5, wherein the wrap parameter comprises a wrap period or a wrap value, wherein the wrap period is to define another count of memory transactions after which the sub-address sequence is to be returned to the wrap address, wherein the wrap value is to define a predefined memory address at which the sub-address sequence is to be returned to the wrap address.

7. The apparatus of claim 5, wherein the wrap address comprises an initial address of the sub-address sequence, or a predefined wrap address different from the initial address of the sub-address sequence.

8. The apparatus of claim 1, wherein the DMT is configured to transform the first data array into the second data array by performing a sequence of read/write cycles, a read/write cycle of the sequence of read/write cycles comprising:

populating the one or more rows of the data sub-array by one or more respective memory entries retrieved by the memory reader from the first memory according to the memory read pattern;

transforming the one or more rows of the data sub-array into the one or more respective columns of the transformed data sub-array; and writing data from one or more rows of the transformed data sub-array to one or more respective memory entries of the second memory according to the memory write pattern.

9. The apparatus of claim 1, wherein the DMT is configured to configure at least one of a count of the rows in the data sub-array or a count of the columns in the data sub-array based on input R2C configuration information.

10. The apparatus of claim 1, wherein a count of the rows in the data sub-array and a count of the columns in the data sub-array are based on an element size of a data element in the first data array.

11. The apparatus of claim 1, wherein a count of the rows in the data sub-array is based on a memory entry size of the first memory.

12. The apparatus of claim 1, wherein a count of the rows in the data sub-array is based on a count of data elements of the first data array per memory entry of the first memory.

13. The apparatus of claim 1, wherein a count of the columns in the data sub-array is based on a memory entry size of the second memory.

14. The apparatus of claim 1, wherein a count of the columns in the data sub-array is based on a count of data elements of the second data array per memory entry of the second memory.

15. The apparatus of claim 1, wherein each of the first data array and the second data array comprises two or more dimensions.

16. The apparatus of claim 1 comprising a processor configured to generate radar information based on the second data array in the second memory.

17. The apparatus of claim 16, wherein the first data array in the first memory comprises first processed radar data arranged in the first data array according to a first radar-processing dimension, wherein the second data array is arranged according to a second radar-processing dimension to be processed by the processor.

18. The apparatus of claim 17, wherein the processor is configured to generate second processed radar data by processing data from the second data array according to the second radar-processing dimension, to store the second processed radar data in a third data array in the first memory, and to configure the DMT to transform the third data array from the first memory into a fourth data array to be stored in the second memory, the fourth data array is arranged according to a third radar-processing dimension to be processed by the processor.

19. The apparatus of claim 18, wherein the second radar-processing dimension is different from the first radar-processing dimension, and the third radar-processing dimension is different from the second radar-processing dimension.

20. A product comprising one or more tangible computer-readable non-transitory storage media comprising instructions operable to, when executed by at least one processor, enable the at least one processor to cause a Data Mover and Transformer (DMT) to:

transform a first data array retrieved from a first memory into a second data array to be stored in a second memory by:

processing input information to identify read-pattern information and write-pattern information;

configuring a Row to Column (R2C) transformer to transform a data sub-array into a transformed data sub-array by transforming one or more rows of the data sub-array into one or more respective columns of the transformed data sub-array;

populating the data sub-array with data retrieved from the first memory according to a memory read pattern, the memory read pattern is based on the read-pattern information, wherein the memory read pattern is based on a predefined transformation from the first data array to the second data array; and writing data from the transformed data sub-array to the second memory according to a memory write pattern, the memory write pattern is based on the write-pattern information, wherein the memory write pattern is based on the predefined transformation from the first data array to the second data array.

21. The product of claim 20, wherein the read-pattern information comprises read sub-address information to define a plurality of read sub-address sequences, wherein the write-pattern information comprises write sub-address information to define a plurality of write sub-address sequences.

22. The product of claim 20, wherein the read-pattern information comprises read sub-address information to define a plurality of read sub-address sequences, the memory read pattern is based on a combination of the plurality of read sub-address sequences, wherein the write-pattern information comprises write sub-address information to define a plurality of write sub-address sequences, the memory write pattern is based on a combination of the plurality of write sub-address sequences.

23. The product of claim 20, wherein the instructions, when executed, cause the DMT to transform the first data array into the second data array by performing a sequence of read/write cycles, a read/write cycle of the sequence of read/write cycles comprising:

populating the one or more rows of the data sub-array by one or more respective memory entries retrieved from the first memory according to the memory read pattern;

transforming the one or more rows of the data sub-array into the one or more respective columns of the transformed data sub-array; and writing data from one or more rows of the transformed data sub-array to one or more respective memory entries of the second memory according to the memory write pattern.

24. A computing device comprising:

a first memory;

a second memory;

a Data Mover and Transformer (DMT) configured to transform a first data array retrieved from the first memory into a second data array to be stored in the second memory, the DMT comprising:

an input to input read-pattern information and write-pattern information;

a Row to Column (R2C) transformer configured to transform a data sub-array into a transformed data sub-array by transforming one or more rows of the data sub-array into one or more respective columns of the transformed data sub-array;

a memory reader to populate the data sub-array with data retrieved from the first memory according to a memory read pattern, the memory read pattern is based on the read-pattern information, wherein the memory read pattern is based on a predefined transformation from the first data array to the second data array; and a memory writer to write data from the transformed data sub-array to the second memory according to a memory write pattern, the memory write pattern is based on the write-pattern information, wherein the memory write pattern is based on the predefined transformation from the first data array to the second data array; and a processor configured to process the second data array in the second memory.

25. The computing device of claim 24, wherein the DMT is configured to transform the first data array into the second data array by performing a sequence of read/write cycles, a read/write cycle of the sequence of read/write cycles comprising:

populating the one or more rows of the data sub-array by one or more respective memory entries retrieved by the memory reader from the first memory according to the memory read pattern;

transforming the one or more rows of the data sub-array into the one or more respective columns of the transformed data sub-array; and writing data from one or more rows of the transformed data sub-array to one or more respective memory entries of the second memory according to the memory write pattern.

* * * * *